United States Patent
Ichimura et al.

(10) Patent No.: US 8,711,908 B2
(45) Date of Patent: Apr. 29, 2014

(54) INTERFACE CIRCUIT

(75) Inventors: Gen Ichimura, Tokyo (JP); Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 1145 days.

(21) Appl. No.: 12/452,636

(22) PCT Filed: May 12, 2009

(86) PCT No.: PCT/JP2009/058844
§ 371 (c)(1),
(2), (4) Date: Jan. 11, 2010

(87) PCT Pub. No.: WO2009/139386
PCT Pub. Date: Nov. 19, 2009

(65) Prior Publication Data
US 2010/0118927 A1    May 13, 2010

(30) Foreign Application Priority Data
May 12, 2008   (JP) ................. P2008-124567

(51) Int. Cl.
*H04B 1/38*   (2006.01)
*H04B 3/00*   (2006.01)

(52) U.S. Cl.
USPC ......................................... 375/220; 375/257

(58) Field of Classification Search
USPC .......... 375/219, 220, 257; 370/535, 537, 276, 370/282, 284; 455/73, 88
See application file for complete search history.

(56) References Cited

U.S. PATENT DOCUMENTS

| 5,485,488 A * | 1/1996 | Van Brunt et al. ............. 375/220 |
| 6,738,417 B1 * | 5/2004 | Kim et al. ...................... 375/220 |
| 2005/0135489 A1 * | 6/2005 | Ho et al. ........................ 375/257 |
| 2008/0152024 A1 * | 6/2008 | Takeuchi ....................... 375/257 |
| 2009/0239559 A1 * | 9/2009 | Hollis ............................ 455/500 |

FOREIGN PATENT DOCUMENTS

| JP | 62-090051 A | 4/1987 |
| JP | 2002-204272 A | 7/2002 |
| JP | 2005-151473 A | 6/2005 |
| JP | 2007-311884 A | 11/2007 |

* cited by examiner

*Primary Examiner* — Betsy Deppe
(74) *Attorney, Agent, or Firm* — Lerner, David, Littenberg, Krumholz & Mentlik, LLP

(57) ABSTRACT

A player and an AV amplifier are connected via a cable. An amplifying device amplifies an output signal supplied to an output terminal 14, and outputs the amplified output signal as a transmission signal to the cable. An amplifying device amplifies an output signal supplied to an output terminal, and outputs the amplified output signal as a transmission signal to a cable. An operation device subtracts the output signal supplied to the output terminal from the transmission signal output to the cable. An operation device subtracts the output signal supplied to the output terminal from the transmission signal output to the cable. Therefore, the transmission signal from the AV amplifier is supplied to an input terminal, and the transmission signal from the player is supplied to an input terminal. The transmission signal includes a two-way communication bit indicating whether two-way communication is enabled.

2 Claims, 21 Drawing Sheets

FIG.6

| PREAMBLE | CHANNEL CODING | | |
|---|---|---|---|
| | | | SUB FRAME #1, BLOCK START |
| "B" | 11101000 | 00010111 | |
| | | | SUB FRAME #1 |
| "M" | 11100010 | 00011101 | |
| | | | SUB FRAME #2 |
| "W" | 11100100 | 00011011 | |
| | 0 | 1 | |
| | (STATE IMMEDIATELY BEFORE) | | |

FIG.7

| | 0 | 1 | 2 | 3 | 4 | 5 | 6 | 7 |
|---|---|---|---|---|---|---|---|---|
| 0 | "FOR CONSUMER USE" | "LINEAR PCM" | COPYRIGHT INFORMATION | ADDITIONAL FORMAT INFORMATION | | | "MODE 0" | |
| 1 | CATEGORY CODE | | | | | | | |
| 2 | SOURCE NUMBER | | | | CHANNEL NUMBER | | | |
| 3 | SAMPLING FREQUENCY | | | | CLOCK ACCURACY | | | |
| 4 | WORD LENGTH | | | | ORIGINAL SAMPLING FREQUENCY | | | |
| 5 | [TWO WAY] | [ENCRYPTION] | | | | | | |
| 6 | | | | | | | | |
| 7 | | | | | | | | |
| ⋮ | | | | | | | | |
| 20 | | | | | | | | |
| 21 | | | | | | | | |
| 22 | | | | | | | | |
| 23 | | | | | | | | |

FIG.8A

| 0 | 1 | 2 | 3 | 4 | 5 | 6 | 7 |
|---|---|---|---|---|---|---|---|
| "1" | "1" | MODE | | | ITEM | | |

FIG.8B

| "1" | IU NUMBER |
|---|---|

FIG.8C

| "1" | CATEGORY CODE (C-channel bit 8-14) |
|---|---|

FIG.8D

| "1" | ERROR | USER INFORMATION X | | |
|---|---|---|---|---|
| "1" | ERROR | X | USER INFORMATION Y | |
| "1" | ERROR | Y | | USER INFORMATION Z |
| "1" | ERROR | Z | | |

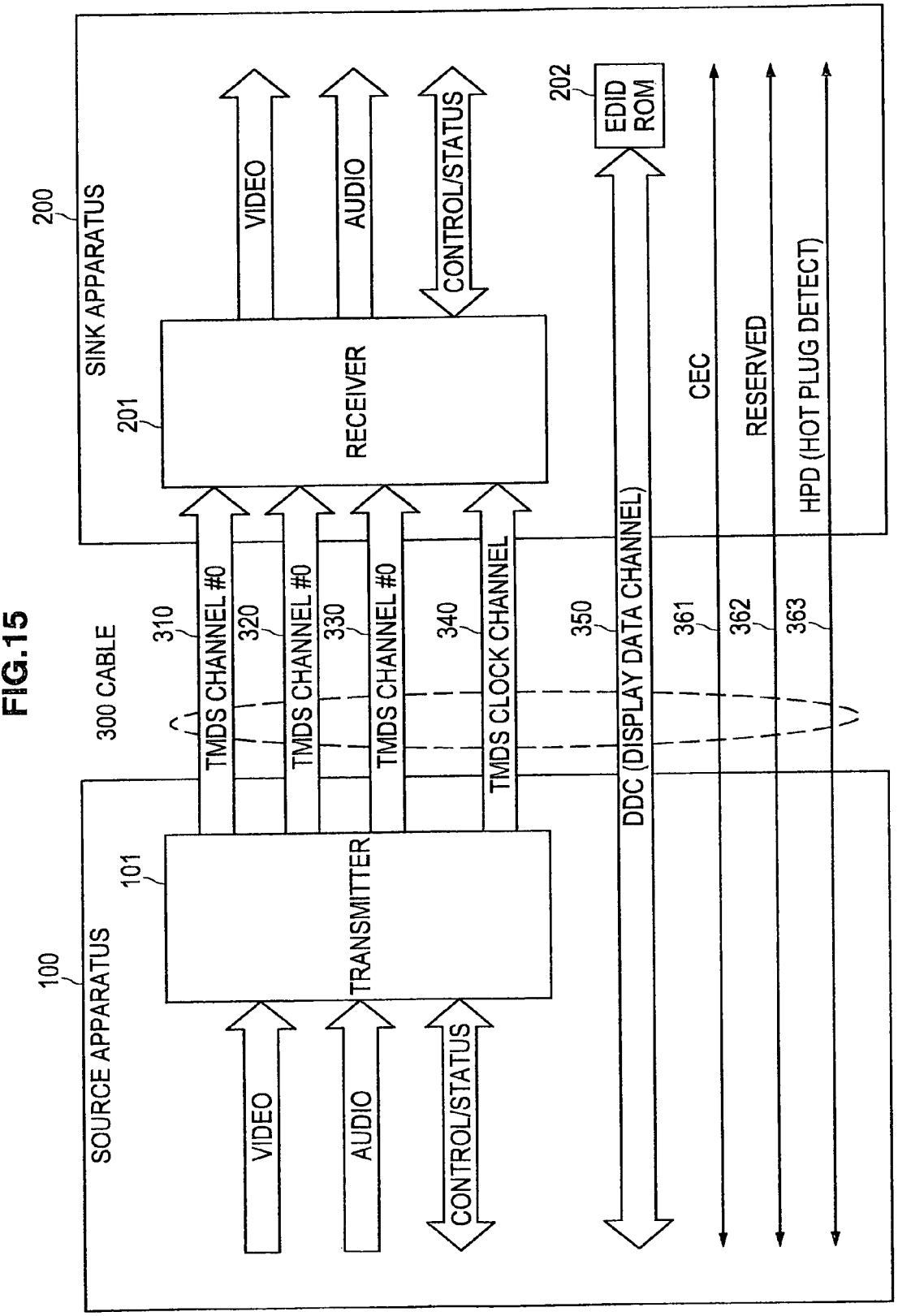

FIG.16

| PIN NUMBER (301) | NAME OF SIGNAL (302) |
|---|---|
| 1 | TMDS DATA 2, POSITIVE ELECTRODE |
| 2 | TMDS DATA 2, SHIELD |
| 3 | TMDS DATA 2, NEGATIVE ELECTRODE |
| 4 | TMDS DATA 1, POSITIVE ELECTRODE |
| 5 | TMDS DATA 1, SHIELD |
| 6 | TMDS DATA 1, SHIELD |
| 7 | TMDS DATA 0, POSITIVE ELECTRODE |
| 8 | TMDS DATA 0, SHIELD |
| 9 | TMDS DATA 0, SHIELD |
| 10 | TMDS CLOCK, POSITIVE ELECTRODE |
| 11 | TMDS CLOCK, SHIELD |
| 12 | TMDS CLOCK, NEGATIVE ELECTRODE |
| 13 | CEC |
| 14 | RESERVED |
| 15 | SCL (DDC SERIAL CLOCK) |
| 16 | SDA (DDC SERIAL DATA) |
| 17 | DDC/CEC GROUND |
| 18 | POWER SOURCE (+5V) |
| 19 | HPD (HOT PLUG DETECTION) |

FIG.19

| MODE | 14TH PIN | 19TH PIN |
|---|---|---|
| (HDMI) | RESERVED | HPD |
| ETHERNET | RESERVED + ETHERNET | HPD - ETHERNET |
| SPDIF | RESERVED + SPDIF | ETHERNET + SPDIF |
| ETHERNET + SPDIF | RESERVED + ETHERNET + SPDIF | HPD - ETHERNET + SPDIF |

…

INTERFACE CIRCUIT

CROSS-REFERENCES TO RELATED APPLICATIONS

The present application is a national phase entry under 35 U.S.C. §371 of International Application No. PCT/JP2009/058844 filed May 12, 2009, published on Nov. 19, 2009 as WO 2009/139386 A1, which claims priority from Japanese Patent Application No. JP 2008-124567 filed in the Japanese Patent Office on May 12, 2008.

TECHNICAL FIELD

The present invention relates to an interface circuit, and more particularly, to an interface circuit for transmitting a digital signal such as an audio signal between apparatuses.

BACKGROUND ART

Recently, as AV (Audio/Visual) apparatuses handling digital signals such as an audio signal and a video signal come into wide use, interfaces of various methods for transmitting digital signals between these AV apparatuses have been proposed. SPDIF (Sony Philips Digital InterFace) is known as one of such interfaces. The SPDIF is an interface for transmitting digital audio signals, and is standardized as "IEC60958" by IEC (International Electrotechnical Commission).

The SPDIF mainly aims to transmit digital audio signals. In order to use the SPDIF more easily, an attempt is made to transmit not only the digital audio signals but also supplementary information relating to sound volume and sound quality (for example, see Patent Document 1).

PRIOR ART DOCUMENT

Patent Document 1: Japanese Patent Application Laid-Open No. 2005-151473 (FIG. 1)

DISCLOSURE OF INVENTION

However, the transmission direction of the SPDIF is limited to one direction from a source apparatus to a sink apparatus, and a signal cannot be transmitted from the sink apparatus to the source apparatus. Therefore, there is a problem in that applications are limited compared with other IEEE (Institute of Electrical and Electronics Engineers) 1394 specification and HDMI (High-Definition Multimedia Interface) specification (HDMI is a registered trademark).

The present invention has been made in view of such circumstances, and it is an object of the present invention to achieve two-way transmission with a one-way transmission interface such as SPDIF.

The present invention has been made in order to solve the above problems, and a first aspect thereof is an interface circuit including: a transmission unit for transmitting an output signal, including two-way information to the effect that two-way communication is supported, to an external apparatus via a transmission path; and an extraction unit for extracting an input signal by adding an inverted signal of the output signal to a signal on the transmission path. This brings about the effect of achieving two-way communication on the transmission path with the external apparatus.

In this first aspect, the output signal or the input signal may include a clock component. This brings about the effect of transmitting and receiving the clock component. For example, a signal modulated by bi-phase mark modulation may also be included.

In this first aspect, the output signal or the input signal may include encryption information indicating whether the content of the output signal is encrypted. This brings about the effect of performing secure transmission and reception on the transmission path.

Further, a second aspect of the present invention is an interface circuit including: a transmission unit for transmitting an output signal to an external apparatus via a transmission path; and an extraction unit for extracting an input signal by adding an inverted signal of the output signal to a signal on the transmission path, wherein only when the input signal includes two-way information to the effect that two-way communication is supported, the transmission unit transmits the output signal. This brings about the effect of performing two-way communication with the external apparatus on the transmission path only when the input signal includes the two-way information.

In this second aspect, the output signal or the input signal may include a clock component. This brings about the effect of transmitting and receiving the clock component. For example, a signal modulated by bi-phase mark modulation may also be included.

In this second aspect, the output signal or the input signal may include encryption information indicating whether a content of the output signal is encrypted. This brings about the effect of performing secure transmission and reception on the transmission path.

In this second aspect, the output signal may include a control signal for the external apparatus. This brings about the effect of transmitting the control signal in an opposite direction on the transmission path and controlling the external apparatus.

Further, a third aspect of the present invention is an interface circuit including: a first transmission unit for transmitting a first output signal, as a differential signal, to an external apparatus via a transmission path; a first extraction unit for extracting a first input signal by adding an inverted signal of the first output signal to a signal on the transmission path; a second transmission unit for multiplexing on the transmission path a second output signal, as a common-mode signal, including two-way information to the effect that two-way communication is supported, and for transmitting the second output signal to the external apparatus via the transmission path; and a second extraction unit for extracting a second input signal by adding an inverted signal of the second output signal to the signal on the transmission path. This brings about the effect of performing two-way communication using the common-mode signal on the transmission path which is adapted for two-way communication using the differential signal.

Further, a fourth aspect of the present invention is an interface circuit including: a first transmission unit for transmitting a first output signal, as a differential signal, to an external apparatus via a transmission path; a first extraction unit for extracting a first input signal by adding an inverted signal of the first output signal to a signal on the transmission path; a second transmission unit for multiplexing on the transmission path a second output signal as a common-mode signal, and for transmitting the second output signal to the external apparatus via the transmission path; and a second extraction unit for extracting a second input signal by adding an inverted signal of the second output signal to the signal on the transmission path, wherein only when the second input signal includes two-way information to the effect that two-way communication is supported, the second transmission unit transmits the second output signal. This brings about the effect of performing two-way communication using the common-mode signal on the transmission path which is adapted for two-way communication using the differential signal only when the input signal includes the two-way information.

In the third and fourth aspects of the present invention, two-way communication according to the Internet Protocol (IP) can be performed as the two-way communication performed with the differential signal by the first transmission unit. Further, the transmission path can use a reserve line and a hot plug detection line which constitute an HDMI cable.

The present invention exhibits remarkable effects of achieving two-way transmission with a one-way transmission interface such as SPDIF.

BRIEF DESCRIPTION OF THE DRAWINGS

FIG. 6 is a figure showing a channel coding of a preamble according to the SPDIF specification.

FIG. 7 is a figure showing a format of a channel status according to the SPDIF specification.

FIG. 8A is a figure showing a format of user data according to the SPDIF specification.

FIG. 8B is a figure showing a format of user data according to the SPDIF specification.

FIG. 8C is a figure showing a format of user data according to the SPDIF specification.

FIG. 8D is a figure showing a format of user data according to the SPDIF specification.

FIG. 15 is a schematic configuration diagram showing an interface according to the HDMI specification.

FIG. 16 is a figure showing an exemplary pin arrangement of a connector according to the HDMI specification.

FIG. 19 is a figure schematically showing operation in an applied example according to the embodiment of the present invention.

BEST MODE FOR CARRYING OUT THE INVENTION

Next, embodiments of the present invention will be described in detail with reference to the drawings.

Figure 1:
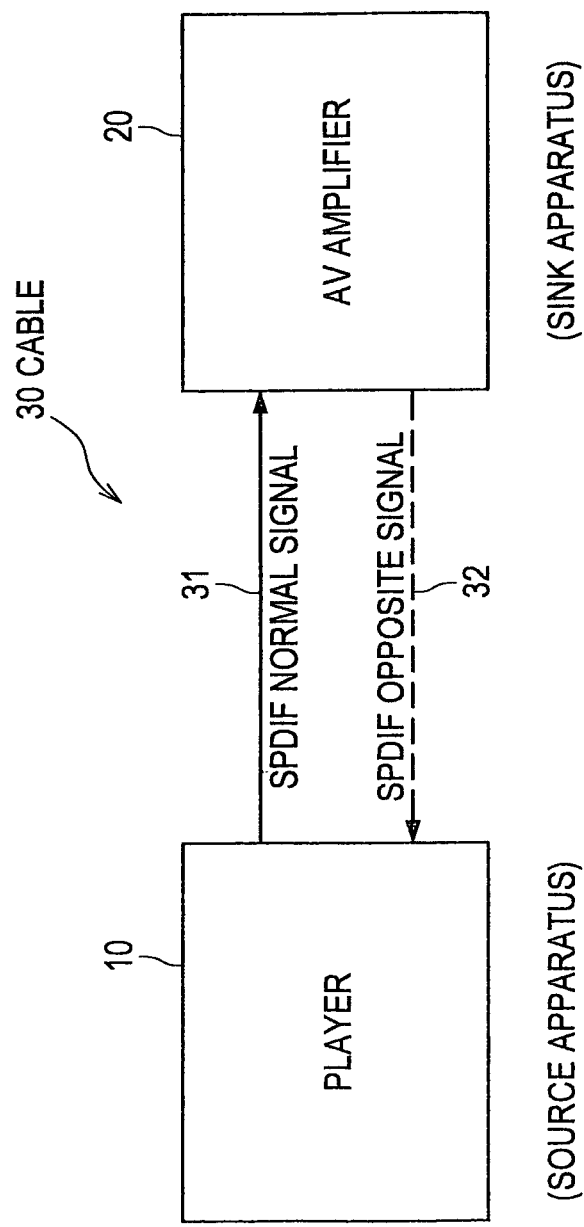
FIG. 1 is a schematic configuration diagram showing an interface according to an embodiment of the present invention.

FIG. 1 is a schematic configuration diagram showing an interface according to an embodiment of the present invention. In the figure, a cable 30 based on SPDIF (Sony Philips Digital InterFace) specification is connected between a player 10 and an AV (Audio/Visual) amplifier 20. In the SPDIF specification, the transmission direction is in one way, and a transmitting apparatus is called a source apparatus, whereas a receiving apparatus is called a sink apparatus. In this example, the player 10 corresponds to the source apparatus, and the AV amplifier 20 corresponds to the sink apparatus.

Therefore, in the conventional SPDIF specification, only a signal in a normal direction from the player 10 to the AV amplifier 20 (SPDIF normal signal 31) is transmitted. In contrast, in the embodiment of the present invention, a signal in the opposite direction from the AV amplifier 20 to the player 10 (SPDIF opposite signal 32) is also transmitted in the cable 30. In other words, two-way transmission is enabled with the SPDIF without physically changing pin arrangement of a connector of the cable 30.

Figure 2:
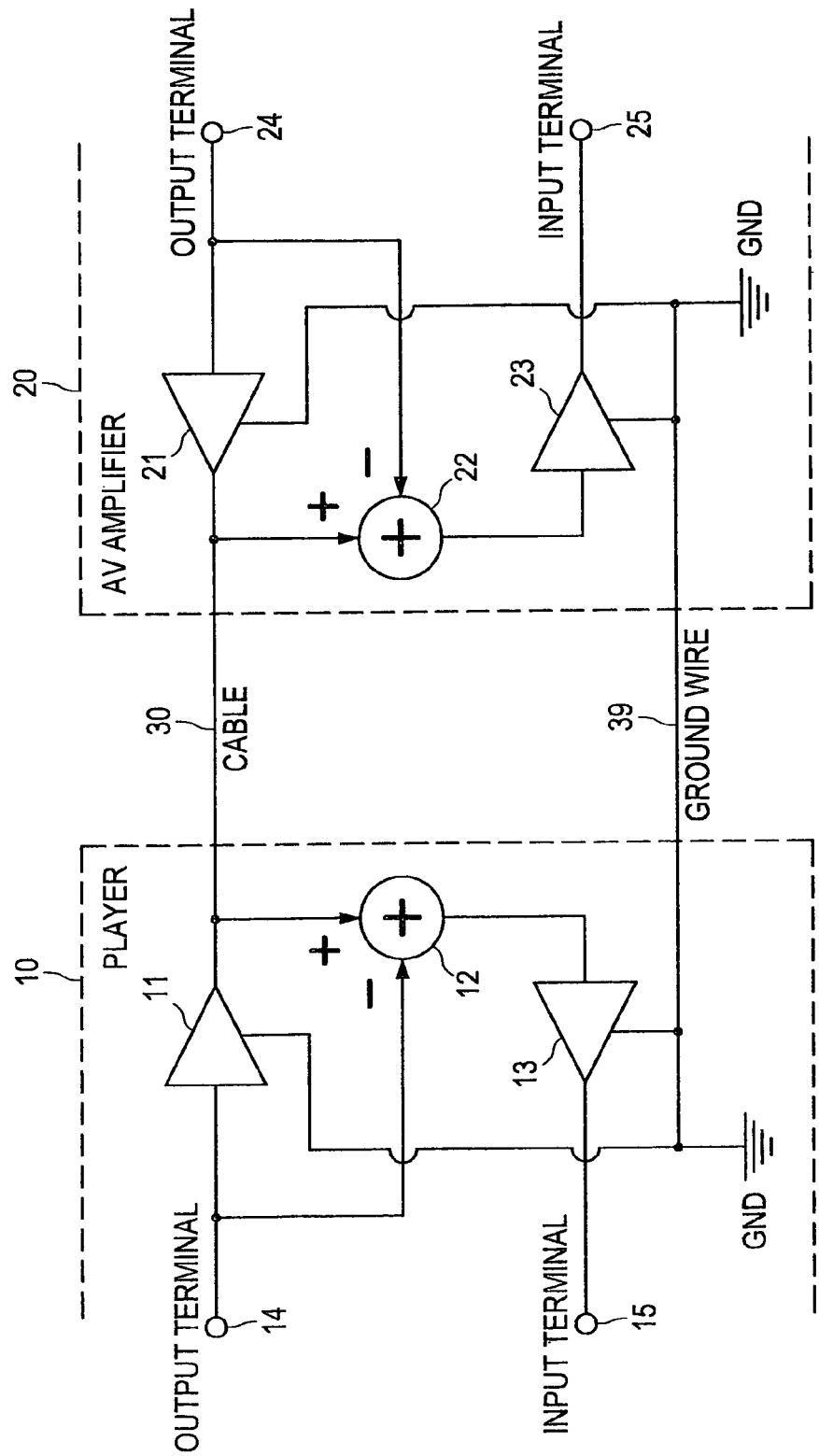
FIG. 2 is an exemplary circuit configuration diagram showing the interface according to the embodiment of the present invention.

FIG. 2 is an exemplary circuit configuration diagram showing the interface according to the embodiment of the present invention. The player 10 and the AV amplifier 20 are connected by the cable 30. A ground wire 39 is a common ground wire for the player 10 and the AV amplifier 20, and is grounded to a ground terminal GND.

The player 10 has amplifying devices 11 and 13 and an operation device 12, as a connection circuit to the cable 30.

The amplifying device 11 amplifies an output signal supplied to an output terminal 14, and outputs the amplified output signal, as a transmission signal, to the cable 30. The transmission signal output from this amplifying device 11 is output to the cable 30 and is also supplied to one of inputs of the operation device 12.

The operation device 12 inverts the output signal supplied to the output terminal 14, and adds the inverted output signal to the transmission signal output by the amplifying device 11 to the cable 30. The operation performed by the operation device 12 is equivalent to subtracting the output signal supplied to the output terminal 14 from the transmission signal output by the amplifying device 11 to the cable 30.

The amplifying device 13 amplifies the operation result of the operation device 12 as a reception signal. The output of this amplifying device 13 is supplied to an input terminal 15.

Further, just like the player 10, the AV amplifier 20 has amplifying devices 21 and 23 and an operation device 22 as a connection circuit to the cable 30.

The amplifying device 21 amplifies an output signal supplied to an output terminal 24, and outputs the amplified output signal as a transmission signal to the cable 30. The transmission signal output from this amplifying device 21 is output to the cable 30 and is also supplied to one of inputs of the operation device 22.

The operation device 22 inverts the output signal supplied to the output terminal 24, and adds the inverted output signal to the transmission signal output by the amplifying device 21 to the cable 30. The operation performed by the operation device 22 is equivalent to subtracting the output signal supplied to the output terminal 24 from the transmission signal output by the amplifying device 21 to the cable 30.

The amplifying device 23 amplifies the operation result of the operation device 22 as a reception signal. The output of this amplifying device 23 is supplied to an input terminal 25.

As described above, the operation devices 12 and 22 subtract the output signal from the transmission signal, so that a signal transmitted from another apparatus can be received, and not only a normal signal based on the original SPDIF specification but also an opposite signal can be transmitted and received.

In the embodiment of the present invention, the amplifying devices 11 and 21 are an example of a transmission unit recited in claims. Further, the operation devices 12 and 22 are an example of an extraction unit recited in claims.

Although a ground line 39 is illustrated in this example, the examples mentioned below will be explained with the ground line omitted from the drawings.

Next, the SPDIF specification will be explained with reference to the drawings.

Figure 3:
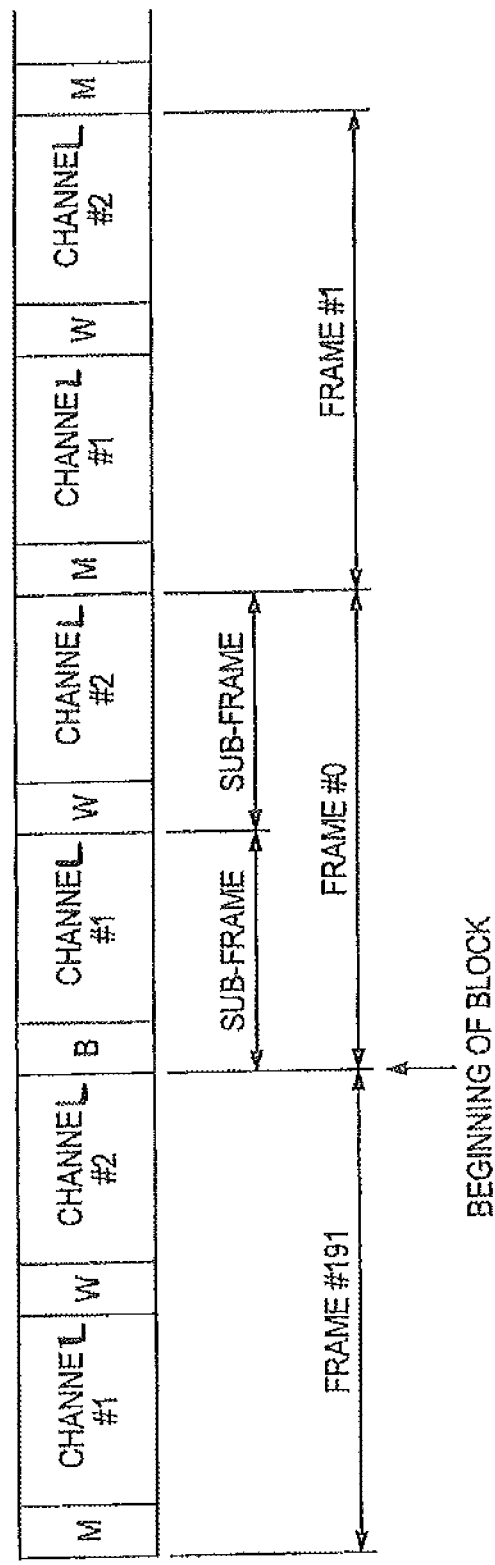
FIG. 3 is a figure showing a frame configuration according to the SPDIF specification.

FIG. 3 is a figure showing a frame configuration according to the SPDIF specification. In the SPDIF specification, each frame includes two sub-frames. In a case of two-channel stereo audio, the first sub-frame includes a left channel signal, and the second sub-frame includes a right channel signal.

At the beginning of the sub-frame, a preamble is arranged as explained below. A preamble "M" is attached to the left channel signal, and a preamble "W" is attached to the right channel signal. However, "B" is attached to the first preamble in every 192 frames to represent the start of a block. In other words, one block includes 192 frames. The block is a unit constituting a later-described channel status.

Figure 4:
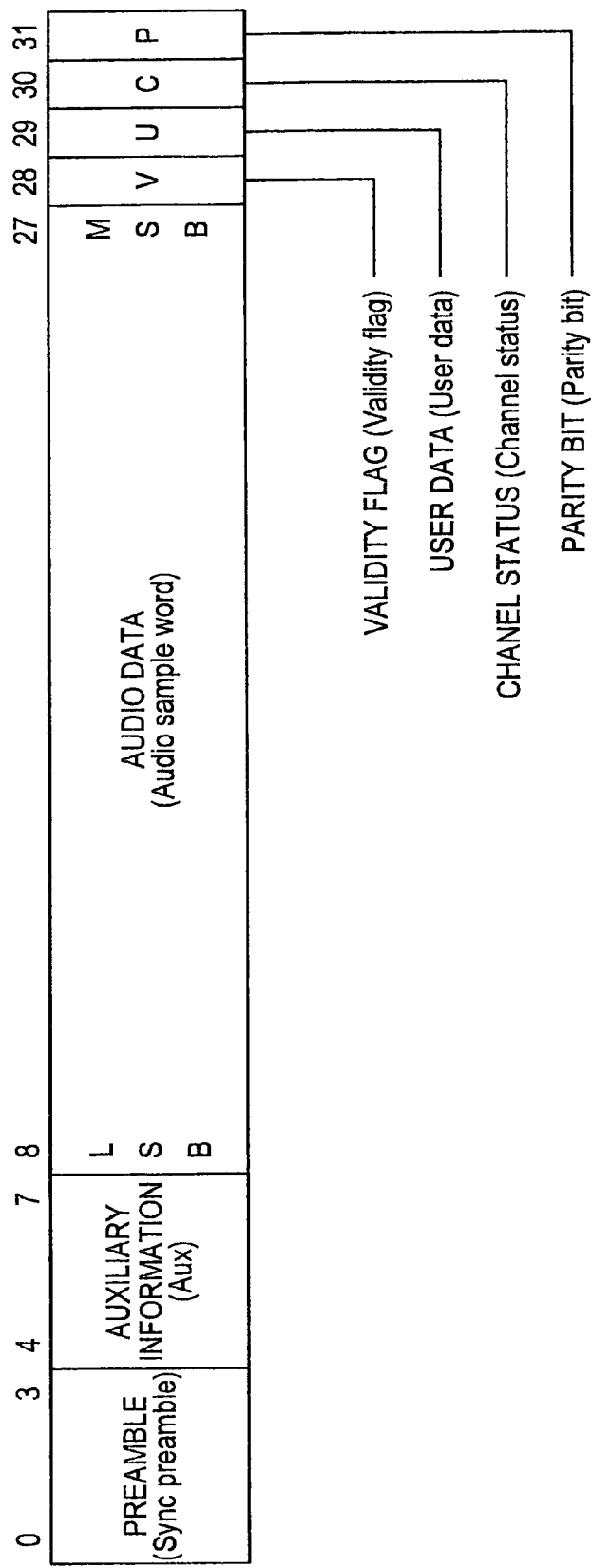
FIG. 4 is a figure showing a sub-frame configuration according to the SPDIF specification.

FIG. 4 is a figure showing a sub-frame configuration according to the SPDIF specification. A sub-frame includes 0th to 31st time slots, totally 32 time slots.

The 0th to 3rd time slots represent the preamble (Sync preamble). This preamble indicates any of "M", "W", and "B" to represent a distinction between the left and right channels and the start position of a block as described above.

The 4th to 27th time slots are a main data field. When 24-bit code range is employed, the entire time slots represent audio data. Alternatively, when 20-bit code range is employed, the 8th to 27th time slots represent audio data (Audio sample word). In the latter case, the 4th to 7th time slots can be used as auxiliary information (Auxiliary sample bits).

The 28th time slot is a validity flag of the main data field.

The 29th time slot represents one bit of user data. A series of user data can be structured by accumulating the 29th time slots extending over frames. A message of this user data is structured in units of 8-bit information units (IU), and one message includes 3 to 129 information units. 0 to 8 bits of "0" may exist between information units. The first information unit is marked with a start bit "1". The first seven information units in a message are reserved, and a user can set arbitrary information to the 8th and subsequent information units. Messages are delimited by 8 bits or more of "0".

The 30th time slot represents one bit of channel status. A series of channel status can be structured by accumulating the 30th time slots extending over frames in each block. The beginning of a block is marked by the preamble (the 0th to 3rd time slots) as described above. The format of the channel status will be explained later.

The 31st time slot is a parity bit. This parity bit is given so that the 4th to 31st time slots include even numbers of "0" and "1".

Figure 5:
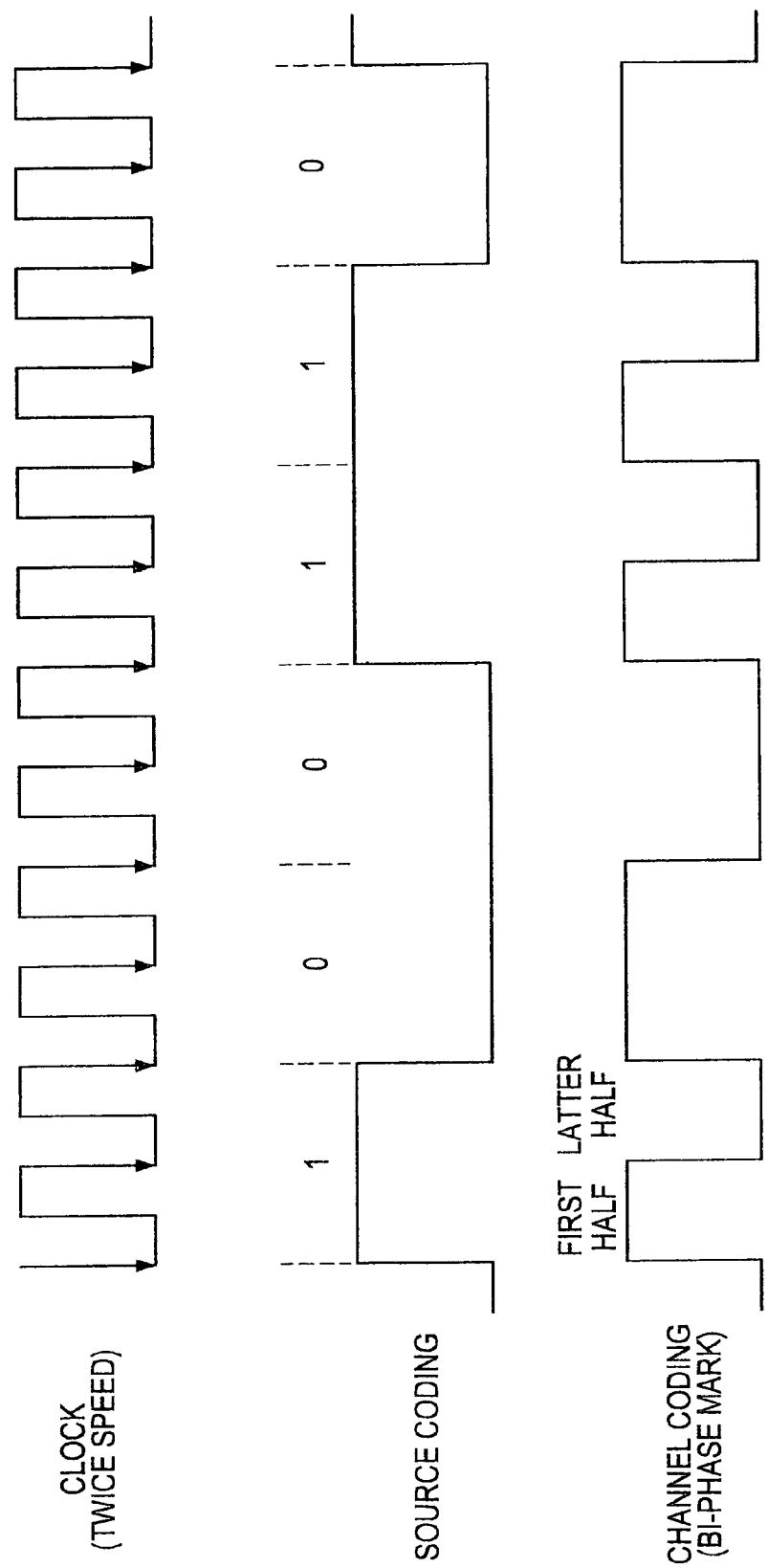
FIG. 5 is a figure showing a signal modulation method according to the SPDIF specification.

FIG. 5 is a figure showing a signal modulation method according to the SPDIF specification. In the SPDIF specification, the 4th to 31st time slots of the sub-frame excluding the preamble is modulated by bi-phase mark modulation.

In the bi-phase mark modulation, a clock twice as fast as that of an original signal (source coding) is used. When the clock cycle of the original signal is divided into the first half and the latter half, the output of the bi-phase mark modulation always inverts at the edge of the first half of the clock cycle. At the edge of the latter half of the clock cycle, the output inverts when the original signal represents "1", whereas the output does not invert when the original signal represents "0". Therefore, a clock component of the original signal can be extracted from a signal modulated by bi-phase mark modulation.

FIG. 6 is a figure showing a channel coding of the preamble according to the SPDIF specification. As described above, the 4th to 31st time slots of a sub-frame is modulated by bi-phase mark modulation. On the other hand, the preamble of the 0th to 3rd time slots is not modulated by a normal bi-phase mark modulation, but is treated as a bit pattern in synchronization with a twice-speed clock. In other words, two bits are assigned to each of the 0th to 3rd time slots, so that an 8-bit pattern as shown in the figure is obtained.

When the state immediately before is "0", "11101000" is assigned to the preamble "B", "11100010" is assigned to the preamble "M", and "1100100" is assigned to the preamble "W". On the other hand, when the state immediately before is "1", "00010111" is assigned to the preamble "B", "00011101" is assigned to the preamble "M", and "00011011" is assigned to the preamble "W".

FIG. 7 is a figure showing a format of a channel status according to the SPDIF specification. The channel status is obtained by accumulating the 30th time slots of the sub-frames in each block, and the channel status carries information about the audio channel transmitted in the same sub-frame. In this figure, the contents of the channel status are arranged byte by byte in a vertical direction, and a bit structure of each byte is shown in the horizontal direction. In this explanation, the format is assumed to be for consumer use.

In the 0th byte, the 0th bit indicates that this channel status is for consumer use. The 1st bit indicates whether this audio channel is a linear PCM sample or not. The 2nd bit indicates whether this audio channel is software set with copyright or not. The 3rd to 5th bits are a field serving as additional format information including, for example, information about whether pre-emphasis is applied or not. The 6th and 7th bits are a field indicating a mode.

The 1st byte is a field indicating a category code. This category code represents a model of an apparatus generating the audio signal. This category code is arranged in the 8th to 15th bits from the beginning of the channel status.

In the 2nd byte, the 0th to 3rd bits are a field representing a source number. This source number identifies a source, and indicates a range from "1" to "15". The 4th to 7th bits are a field representing a channel number. This channel number indicates whether this audio channel is a right channel or a left channel.

In the 3rd byte, the 0th to 3rd bits are a field representing a sampling frequency. For example, "0000" represents a sampling frequency of 44.1 kHz. The 4th and 5th bits are a field representing a clock accuracy. In this clock accuracy, the level of accuracy is represented in three levels.

In the 4th byte, the 0th to 3rd bits are a field representing a word length. A value "0" in the 0th bit means that the maximum sample length is 20 bits, and a value "1" in the 0th bit means that the maximum sample length is 24 bits. The subsequent 1st to 3rd bits can represent a particular bit number. The 4th and 5th bits are a field representing an original sampling frequency.

The 5th and subsequent bytes are not defined by the current SPDIF specification. Therefore, in the embodiment of the present invention, the 0th bit of the 5th byte is used as a two-way communication bit indicating whether two-way communication is enabled or not. In other words, for example, when a channel status of a signal transmitted from the player 10 has a value "1" in the 0th bit of the 5th byte, this means that the AV amplifier 20 can perform two-way communication with the player 10. When a channel status of the SPDIF normal signal 31 received from the player 10 has a two-way communication bit of "1", the AV amplifier 20 responds with the SPDIF opposite signal 32. Thereupon, a two-way communication sequence starts on the cable 30. On the other hand, when a channel status of a signal transmitted from the player 10 has a value "0" in the 0th bit of the 5th byte, this means that the AV amplifier 20 cannot perform two-way communication with the player 10. It should be noted that the two-way communication bit is an example of two-way information recited in claims.

In the embodiment of the present invention, the 1st bit of the 5th byte can be used as an encryption bit indicating whether the audio data is encrypted or not. In other words, for example, when a channel status of a signal transmitted from the player 10 has a value "1" in the 1st bit of the 5th byte, this means that the audio data transmitted from the player 10 is encrypted. On the other hand, when a channel status of a signal transmitted from the player 10 has a value "0" in the 1st bit of the 5th byte, this means that the audio data transmitted from the player 10 is not encrypted.

FIG. 8 is a figure showing a format of user data according to the SPDIF specification. The user data is obtained by accumulating the 29th time slots of the sub-frames in each block. As described above, a message of user data is structured in units of 8-bit information units (IU), and one message includes 3 to 129 information units. Messages are delimited by 8 bits or more of "0", and the first information unit is marked with a start bit "1".

As shown in FIG. 8A, the first information unit includes a mode and an item. The mode is a field representing a class of a message, and for example, represents preset information and the like. The item is a field for further defining a type of a message.

As shown in FIG. 8B, the second information unit includes the number of information units. Seven bits excluding the first bit can represent the number of information units in the range of "1" to "127".

As shown in FIG. 8C, the third information unit includes a category code. This category code is determined by a generator of the audio data and is represented by the first byte of the channel status of FIG. 7. Since the first bit of the information unit in the user data serves as a start bit, only seven bits are effective data. These seven bits correspond to the 8th to 14th bits of the channel status. An L bit at the 15th bit represents commercial, prerecorded software, and is not included in the message of this user data.

As shown in FIG. 8D, the 4th to 7th information units include three pieces of user information, X, Y, and Z. One byte (8 bits) is allocated to each of the three pieces of user information. Therefore, in the embodiment of the present invention, an information communication frame may be newly defined within the user data, so that the type of information is represented by the user information X, and actual data can be transmitted by the user information Y and Z in either direction.

Next, a specific example of a system using the two-way communication according to the embodiment of the present invention will be described with reference to the drawings.

Figure 9:
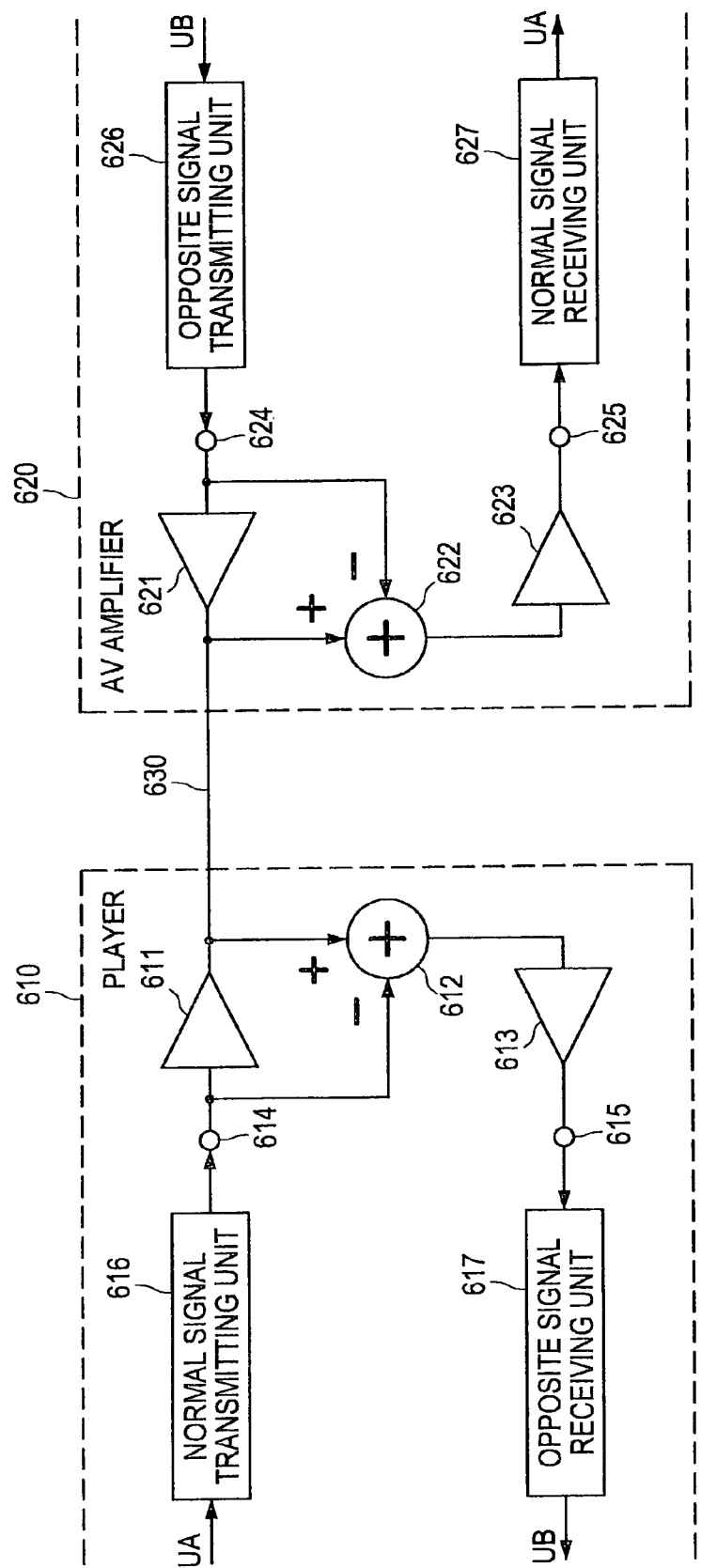
FIG. 9 is an exemplary configuration diagram showing an interface for transmitting and receiving an information communication frame in two ways according to the embodiment of the present invention.

FIG. 9 is an exemplary configuration diagram showing an interface for transmitting and receiving an information communication frame in two ways according to the embodiment of the present invention. In this example, a player 610 and an AV amplifier 620 are connected via a cable 630. An amplifying device 611, an operation device 612, an amplifying device 613, an output terminal 614, and an input terminal 615 of the player 610 respectively correspond to the amplifying device 11, the operation device 12, the amplifying device 13, the output terminal 14, and the input terminal 15. Further, an amplifying device 621, an operation device 622, an amplifying device 623, an output terminal 624, and an input terminal 625 of the AV amplifier 620 respectively correspond to the amplifying device 21, the operation device 22, the amplifying device 23, the output terminal 24, and the input terminal 25.

The player 610 has a normal signal transmission unit 616 for transmitting a normal signal to the output terminal 614 and an opposite signal reception unit 617 for receiving an opposite signal from the input terminal 615. The player 610 transmits user data UA to the AV amplifier 620. On the other hand, the player 610 receives user data UB from the AV amplifier 620.

The AV amplifier 620 has a normal signal transmission unit 626 for transmitting a normal signal to the output terminal 624 and an opposite signal reception unit 627 for receiving an opposite signal from the input terminal 625. The AV amplifier 620 transmits the user data UB to the player 610. On the other hand, the AV amplifier receives the user data UA from the player 610.

As described above, in the embodiment of the present invention, the player 610 and the AV amplifier 620 are arranged with the operation devices 612 and 622, respectively, which subtract the transmission signal from the signal on the cable 630, so that the reception signal from another apparatus can be extracted.

Figure 10:
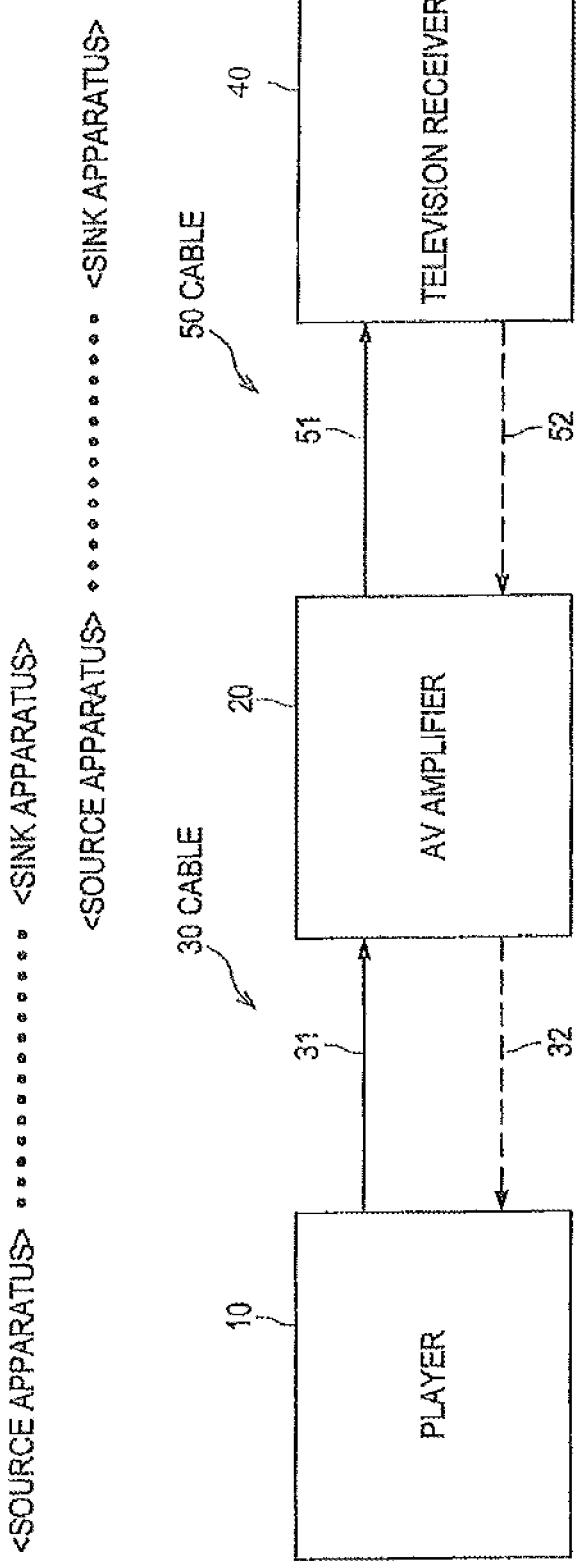
FIG. 10 is a figure showing a system configuration example using the interface according to the embodiment of the present invention.

FIG. 10 is a figure showing a system configuration example using the interface according to the embodiment of the present invention. In this system configuration example, the player 10 and the AV amplifier 20 are connected via the cable 30, and the AV amplifier 20 and a television receiver apparatus 40 are connected via a cable 50.

In the connection relationship between the player 10 and the AV amplifier 20, the player 10 serves as the source apparatus, and the AV amplifier 20 serves as the sink apparatus. In the connection relationship between the AV amplifier 20 and the television receiver apparatus 40, the AV amplifier 20 serves as the source apparatus, and the television receiver apparatus 40 serves as the sink apparatus.

The cable 30 carries the SPDIF normal signal 31 in the normal direction from the player 10 to the AV amplifier 20 and the SPDIF opposite signal 32 in the opposite direction from the AV amplifier 20 to the player 10. The cable 50 carries an SPDIF normal signal 51 in a normal direction from the AV amplifier 20 to the television receiver apparatus 40 and an SPDIF opposite signal 52 in an opposite direction from the television receiver apparatus 40 to the AV amplifier 20.

In the connection as described above, the audio signal is transmitted as a normal signal from the player 10 via the AV amplifier 20 to the television receiver apparatus 40. In the embodiment of the present invention, the opposite signal can be transmitted from the television receiver apparatus 40 via the AV amplifier 20 to the player 10. Therefore, for example, a remote control operation signal of the television receiver apparatus 40 may be transmitted as an opposite signal, so that apparatus controls such as power-on/standby, reproduce/stop, and fast-forward can be performed on the player 10. In addition, information about titles of music can be obtained.

Figure 11:
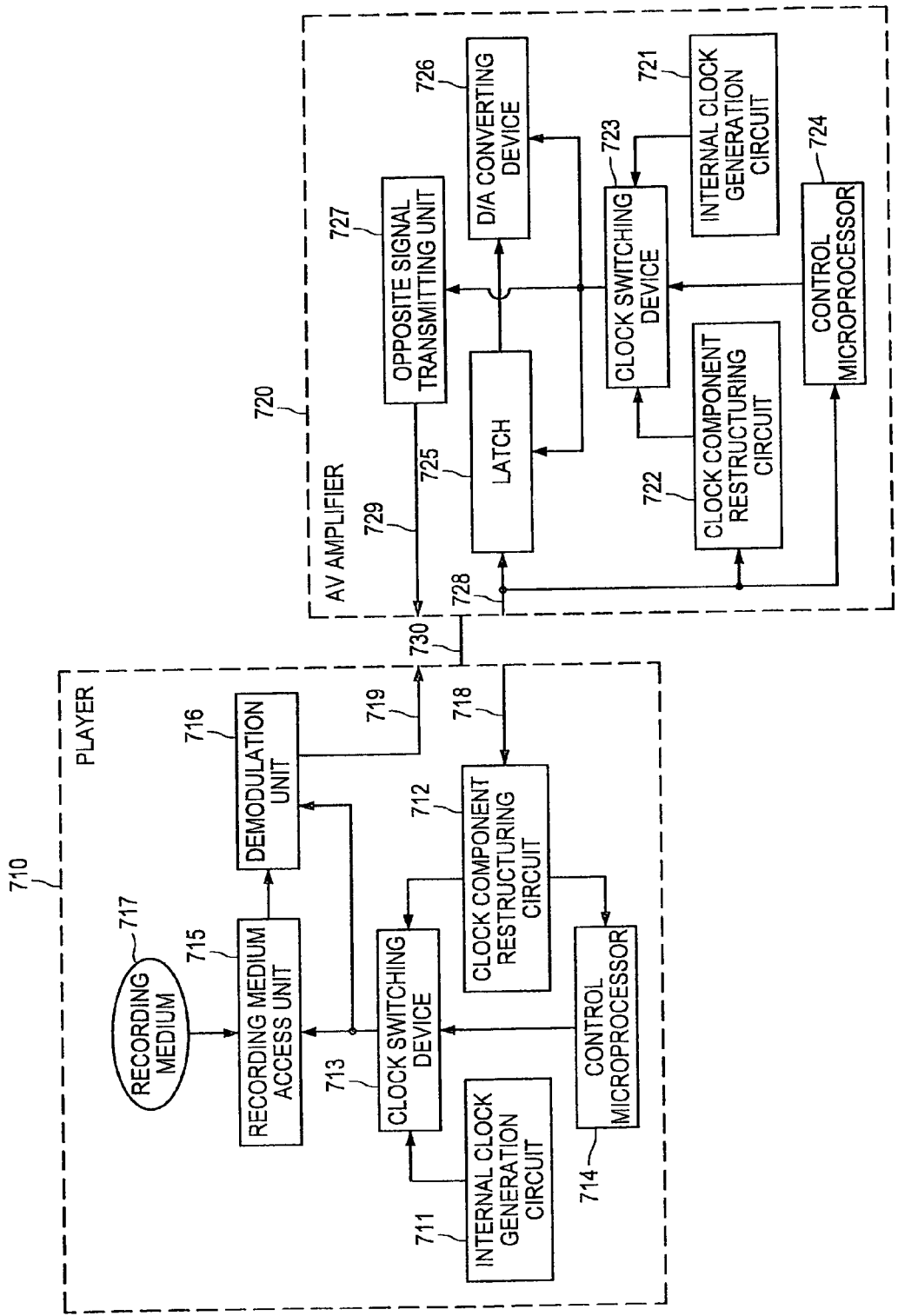
FIG. 11 is a figure showing an exemplary clock transmission using the interface according to the embodiment of the present invention.

FIG. 11 is a figure showing an exemplary clock transmission using the interface according to the embodiment of the present invention. Herein, an AV system is assumed which includes a player 710 and an AV amplifier 720 which are connected via a cable 730. Herein, an interface section is not explicitly described, but the AV system is assumed to have the same configuration as in FIG. 2.

The player 710 includes an internal clock generation circuit 711, a clock component restructuring circuit 712, a clock switching device 713, a control microcomputer 714, a recording medium access unit 715, and a decoding unit 716.

The internal clock generation circuit 711 is a circuit for generating a clock signal within the player 710. This internal clock generation circuit 711 generates a clock signal using an oscillated amplitude voltage of an oscillator such as a crystal oscillator (crystal).

The clock component restructuring circuit 712 is a circuit for restructuring a clock component based on the SPDIF opposite signal supplied by the AV amplifier 720 to a signal line 718. Specifically, this clock component restructuring circuit 712 includes a PLL (Phase Locked Loop) circuit, and generates a clock signal that has the same phase and frequency as the SPDIF opposite signal supplied from the AV amplifier 720.

The clock switching device 713 is a circuit for switching the output clock by selecting any one of the clock generated by the internal clock generation circuit 711 and the clock restructured by the clock component restructuring circuit 712.

The control microcomputer 714 is a microcomputer for controlling operation of the player 710. When this control microcomputer 714 detects that the clock component is restructured by the clock component restructuring circuit 712, the control microcomputer 714 instructs the clock switching device 713 to select the clock from the clock component restructuring circuit 712.

The recording medium access unit 715 is a circuit for reading a video signal and an audio signal from a recording medium 717 in accordance with the clock output from the clock switching device 713.

In accordance with the clock output from the clock switching device 713, the decoding unit 716 decodes the video signal and the audio signal read by the recording medium access unit 715. The signal decoded by this decoding unit 716 is transmitted as an SPDIF normal signal from a signal line 719 to the AV amplifier 720.

The AV amplifier 720 receives a signal supplied to a signal line 728 from the player 710, and amplifies the audio signal of the received signal. This AV amplifier 720 includes an internal clock generation circuit 721, a clock component restructuring circuit 722, a clock switching device 723, a control microcomputer 724, a latch 725, a D/A converting device 726, and an opposite signal transmission unit 727.

The internal clock generation circuit 721 is a circuit for generating a clock signal within the AV amplifier 720. This internal clock generation circuit 721 generates a clock signal using an oscillated amplitude voltage of an oscillator such as a crystal oscillator (crystal) in a similar manner to the internal clock generation circuit 711.

The clock component restructuring circuit 722 is a circuit for restructuring a clock component based on the SPDIF opposite signal supplied by the player 710 to a signal line 728. This clock component restructuring circuit 722 is realized with a PLL circuit in a similar manner to the clock component restructuring circuit 712, and generates a clock signal that has the same phase and frequency as the SPDIF normal signal supplied from the player 710.

The clock switching device 723 is a circuit for switching the output clock by selecting any one of the clock generated by the internal clock generation circuit 721 and the clock restructured by the clock component restructuring circuit 722.

The control microcomputer 724 is a microcomputer for controlling operation of the AV amplifier 720. When the 0th bit of the 5th byte of the channel status (FIG. 7) indicates that the opposite-way communication is enabled, the control microcomputer 724 causes the clock switching device 723 to select the clock generated by the internal clock generation circuit 721. On the other hand, when it indicates that the opposite-way communication is disabled, the control microcomputer 724 causes the clock switching device 723 to select the clock restructured by the clock component restructuring circuit 722.

The latch 725 stores a signal supplied to the signal line 728 by the player 710. The D/A converting device 726 converts the digital signal stored in the latch 725 into an analog signal. An audio signal of the thus converted analog signal is amplified by an amplifying unit of a subsequent stage (not shown). The latch 725 and the D/A converting device 726 operate in accordance with the clock supplied from the clock switching device 723.

The opposite signal transmission unit 727 transmits the clock supplied by the clock switching device 723 via a signal line 729 to the player 710. This clock is transmitted as the SPDIF opposite signal via the cable 730, and is supplied via the signal line 718 to the clock component restructuring circuit 712. This SPDIF opposite signal includes a clock component generated within the AV amplifier 720. Since the SPDIF opposite signal is transmitted upon being modulated by bi-phase mark modulation, the clock component is always transmitted from the AV amplifier 720 to the player 710 even when the SPDIF opposite signal does not carry any sound. Therefore, in this example, it is not necessary for the SPDIF opposite signal to include effective audio signal.

According to this configuration example, the clock signal generated by the AV amplifier 720 is transmitted to the player 710, and the video signal and the audio signal can be transmitted from the player 710 to the AV amplifier 720 in accordance with the transmitted clock signal. Therefore, the player 710 can operate using the internal clock of the AV amplifier 720 as a master clock, thus being able to achieve a so-called jitterless reproduction. Accordingly, a buffer used for adjusting the speed can be omitted from the AV amplifier 720. Further, when attention is directed to the accuracy of the clock generated by each apparatus, an AV amplifier generally tends to have a higher accuracy of clock than a player. Therefore, the reproduction quality of audio signal can be improved by causing the player 710 to operate using the clock of the AV amplifier 720 as the master clock.

Figure 12:
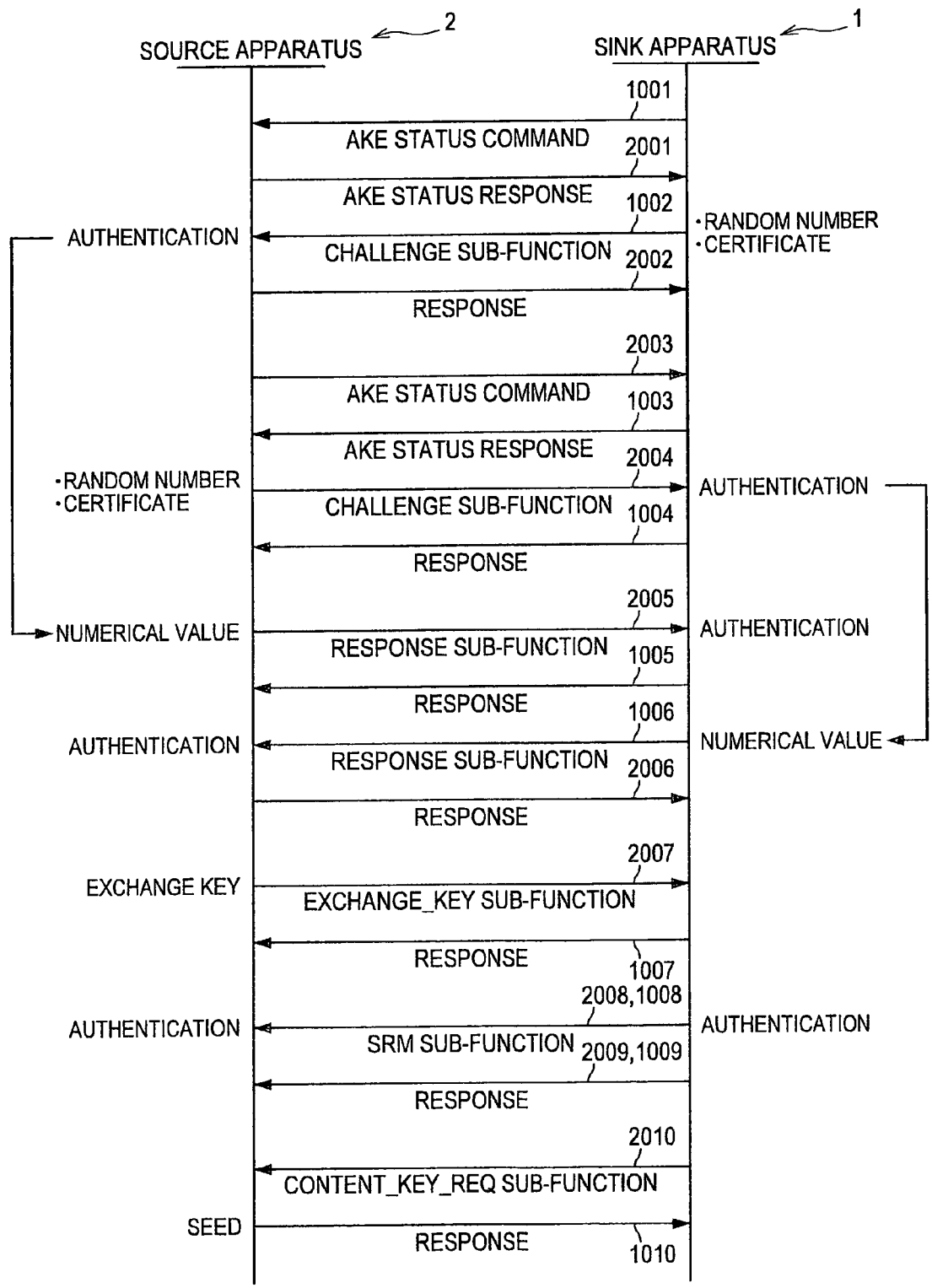
FIG. 12 is a figure showing an exemplary sequence of an authentication processing that can be achieved by the two-way communication according to the embodiment of the present invention.

FIG. 12 is a figure showing an exemplary sequence of an authentication processing that can be achieved by the two-way communication according to the embodiment of the present invention. This authentication processing is called AKE (Authentication and Key Exchange) processing in Digital Transmission Content Protection (DTCP) specification, and prior to exchange of digital data, a key for encryption and decryption is exchanged upon authenticating a sink apparatus 1 to determine that the sink apparatus 1 can appropriately handle copy control information. Then, the digital data are encrypted by a source apparatus 2, and the encrypted digital data are decrypted by the sink apparatus 1. Therefore, protection of digital contents is ensured in the sink apparatus 1, and the digital contents are prevented from being stolen by other apparatuses.

When the authentication processing is performed, the sink apparatus 1 first starts the processing so that the processing is not performed redundantly. First, the sink apparatus 1 checks the state of the source apparatus 2 using an AKE status command 1001. As a result, when the sink apparatus 1 obtains from the source apparatus 2 an AKE status response 2001 to the effect that the source apparatus 2 is ready for reception, the sink apparatus 1 issues a CHALLENGE sub-function 1002 attached with a random number and a certificate. This certificate is issued to each apparatus by Digital Transmission Licensing Administrator (DTLA), an administrative mechanism of DTCP. The source apparatus 2 authenticates the certificate sent from the sink apparatus 1, and returns the result thereof as a response 2002 to the sink apparatus 1. Then, the source apparatus 2 performs the same procedure from the side of the source apparatus 2 (2003, 1003, 2004, 1004).

Subsequently, the source apparatus 2 calculates a predetermined numerical value based on the random number received from the sink apparatus 1, and responds a RESPONSE sub-function 2005 to the sink apparatus 1. Similarly, the sink apparatus 1 calculates a predetermined numerical value based on the random number received from the source apparatus 2, and responds a RESPONSE sub-function 1006 to the source apparatus 2. Each of the apparatuses having received the RESPONSE sub-function 2005 or 1006 performs the authentication processing.

Then, the source apparatus 2 transmits an exchange key with an EXCHANGE_KEY sub-function 2007. When the sink apparatus 1 transmits a CONTENT_KEY_REQ sub-function 2010 to request a seed for calculating a content key, the source apparatus 2 transmits the seed with a response 1010. Therefore, the sink apparatus 1 calculates the content key based on the exchange key and the seed. As described above, the copy control information on contents includes four types, i.e., copy never, copy one generation, no more copy, and copy free, among which only the first three require encryption. Three types of content keys are arranged for the first three, respectively.

In SRM sub-functions 1008 and 2008, an SRM (System Renewability Message) is exchanged. This SRM is exchanged in order to transmit an updated message only to authentic apparatuses so as to avoid authenticating non-authentic apparatuses. An apparatus having received this SRM sub-function performs an authentication processing to confirm that the received SRM is not incorrect.

In the embodiment of the present invention, the authentication for the above copyright protection and the key exchange can be performed by using the user information X to Z of the user data as shown in FIG. 8D. Further, whether encrypted or not can be defined by the 1st bit of the 5th byte of the channel status as shown in FIG. 7. Therefore, in contrast to the conventional SPDIF specification, secure transmission can be achieved by transmitting the audio data upon encrypting the audio data.

It should be noted that the above example is a procedure called full authentication, in which all of the three types of keys are exchanged. In contrast, in a more simplified procedure called restricted authentication, only one key is exchanged. In this restricted authentication, the authentication processings can be performed in about half of the time it takes to perform the full authentication. Further, in the explanation of this example, copyright protection is provided by DTCP, but the present invention is not limited thereto. For example, HDCP (High-bandwidth Digital Content Protection system) may be used.

Figure 13:
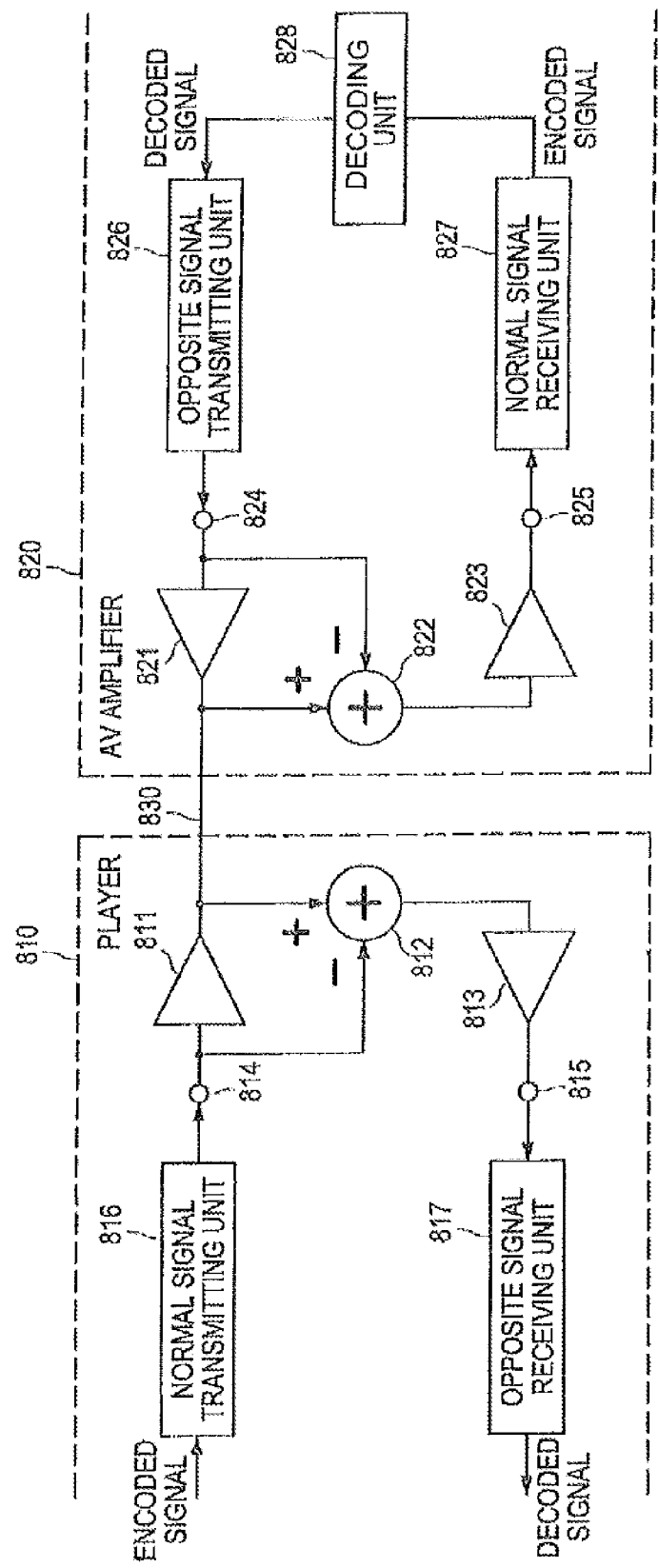
FIG. 13 is a figure showing an exemplary decoding processing using the interface according to the embodiment of the present invention.

FIG. 13 is a figure showing an exemplary decoding processing using the interface according to the embodiment of the present invention. In this example, a player 810 and an AV amplifier 820 are connected via a cable 830. An amplifying device 811, an operation device 812, an amplifying device 813, an output terminal 814, and an input terminal 815 of the player 810 respectively correspond to the amplifying device 11, the operation device 12, the amplifying device 13, the output terminal 14, and the input terminal 15. Further, an amplifying device 821, an operation device 822, an amplifying device 823, an output terminal 824, and an input terminal 825 of the player 820 respectively correspond to the amplifying device 21, the operation device 22, the amplifying device 23, the output terminal 24, and the input terminal 25.

The player 810 has a normal signal transmission unit 816 for transmitting a normal signal to the output terminal 814 and an opposite signal reception unit 817 for receiving an opposite signal from the input terminal 815. The player 810 transmits an encoded signal to the AV amplifier 820. On the other hand, the player 810 receives a decoded signal from the AV amplifier 820.

The AV amplifier 820 has a normal signal reception unit 827 for receiving the encoded signal from the input terminal 825, a decoding unit 828 for decoding the encoded signal and generating a decoded signal, and an opposite signal transmission unit 826 for transmitting the decoded signal to the output terminal 824. The AV amplifier 820 receives the encoded signal from the player 810. Further, the encoded signal is decoded by the decoding unit 828, and the decoded signal is transmitted to the player 810. The decoded signal is carried by the SPDIF opposite signal on the cable 30.

As described above, in the embodiment of the present invention, the encoded signal transmitted from the player 810 is decoded by the AV amplifier 820, and the decoded signal is returned back to the player 810, so that the decoding can be performed using the decoding unit 828 of the AV amplifier 820. For example, when a decoding unit (not shown) of the player 810 is of an obsolete version and is unable to decode an encoded signal, the encoded signal can be decoded using the decoding unit 828 of the AV amplifier 820, and the decoded signal can be returned back to the player 810.

Figure 14:
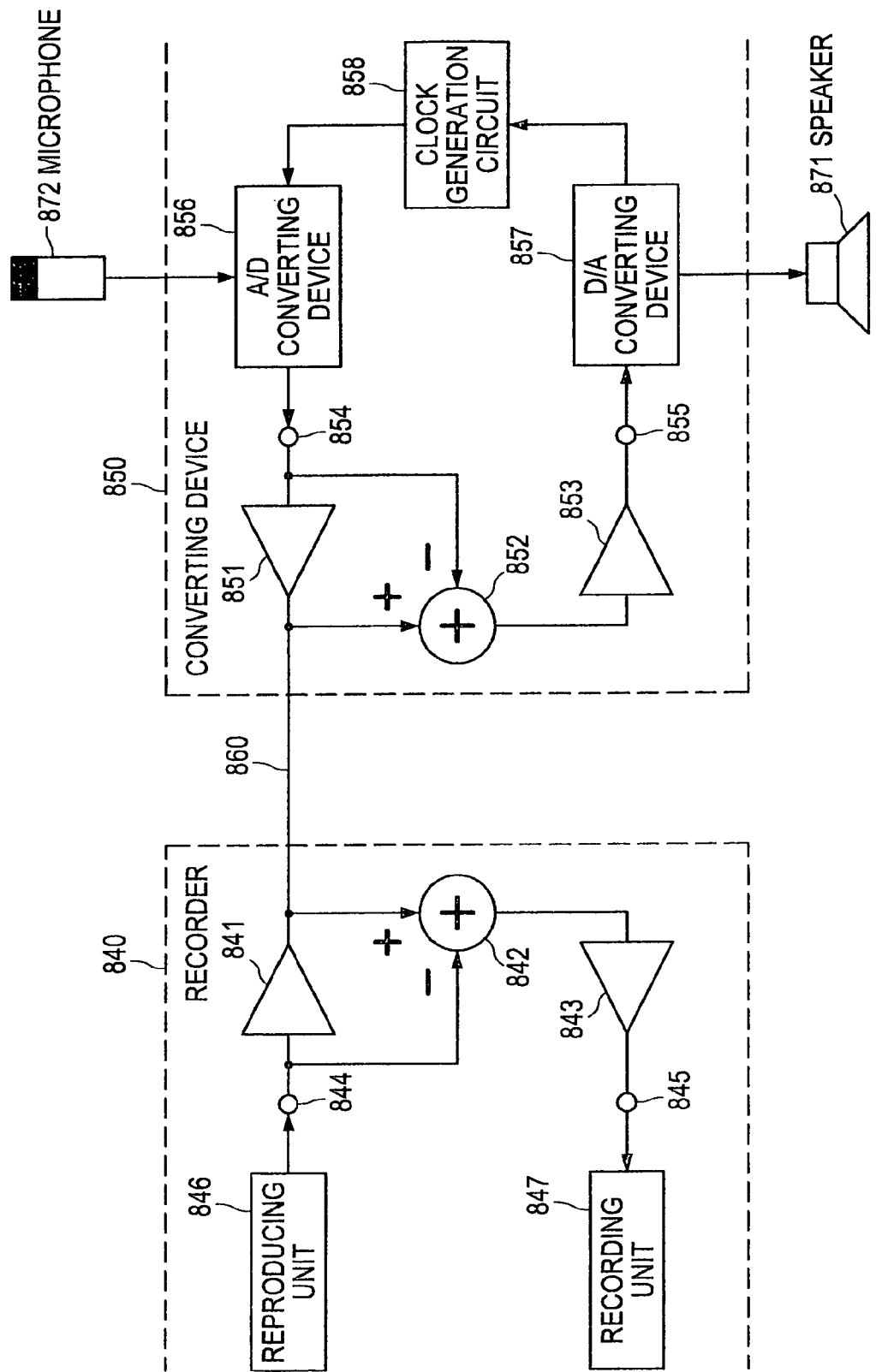
FIG. 14 is a figure showing an exemplary multi-track recording processing using the interface according to the embodiment of the present invention.

FIG. 14 is a figure showing an exemplary multi-track recording processing using the interface according to the embodiment of the present invention. In this example, a recorder 840 and a converting device 850 are connected via a cable 860. An amplifying device 841, an operation device 842, an amplifying device 843, an output terminal 844, and an input terminal 845 of the recorder 840 respectively correspond to the amplifying device 11, the operation device 12, the amplifying device 13, the output terminal 14, and the input terminal 15. Further, an amplifying device 851, an operation device 852, an amplifying device 853, an output terminal 854, and an input terminal 855 of the converting device 850 respectively correspond to the amplifying device 21, the operation device 22, the amplifying device 23, the output terminal 24, and the input terminal 25.

The recorder 840 has a reproducing unit 846 for transmitting a reproduced signal to the output terminal 844 and a recording unit 847 for receiving a recording signal from the input terminal 845. The recorder 840 transmits the reproduced signal to the converting device 850. Further, the recorder 840 receives the recording signal from the converting device 850.

The converting device 850 has a D/A converting device 857 for receiving the reproduced signal from the input terminal 855 and converting the reproduced digital signal into an analog signal and an A/D converting device 856 for converting an analog signal input from the outside into a digital signal. The D/A converting device 857 is connected to a speaker 871, and the analog signal converted by the D/A converting device 857 is output as audio to the speaker 871. The A/D converting device 856 is connected to a microphone 872, and the audio input to the microphone 872 is converted by the A/D converting device 856 into a digital signal, which is supplied to the output terminal 854. The A/D converting device 856 and the D/A converting device 857 operate in accordance with a common clock generated by a clock generation circuit 858.

As described above, in the embodiment of the present invention, the audio output from the speaker 871 and the audio input to the microphone 872 can be controlled by the common clock generated by the clock generation circuit 858. Further, the audio input to the microphone 872 is converted into a digital signal, which is transmitted as a recording signal, so that the reproduced signal and the recording signal can be synchronized. In this case, the reproduced signal is transmitted, as the SPDIF normal signal on the cable 860, from the recorder 840 to the converting device 850, whereas the recording signal is transmitted, as the SPDIF opposite signal on the cable 860, from the converting device 850 to the recorder 840.

Next, an applied example will be explained, in which the interface according to the embodiment of the present invention is applied to a cable according to HDMI (High-definition Multimedia Interface) specification (HDIM is a registered trademark).

FIG. 15 is a schematic configuration diagram showing an interface according to the HDMI specification. In the HDMI specification, the transmission direction of a fundamental, fast transmission line is defined to be in one direction, and an apparatus on transmitting side is called a source apparatus, whereas an apparatus on receiving side is called a sink apparatus. In this example, a source apparatus 100 and a sink apparatus 200 are connected via an HDMI cable 300. Further, the source apparatus 100 includes a transmitter 101 for performing transmission operation, and the sink apparatus 200 includes a receiver 201 for performing receiving operation.

A serial transmission method called TMDS (Transition Minimized Differential Signaling) is used for the transmission between the transmitter 101 and the receiver 201. In the HDMI specification, a video signal and an audio signal are transmitted using three TMDS channels 310 to 330. In an effective image section, i.e., a section between a certain vertical synchronization signal and a subsequent vertical synchronization signal but excluding a horizontal retrace section and a vertical retrace section, differential signals corresponding to pixel data of one screen of non-compressed image are transmitted in one way toward the sink apparatus 200 through the TMDS channels 310 to 330. In a horizontal retrace section and a vertical retrace section, differential signals corresponding to audio data, control data, other supplemental data, or the like are transmitted in one way toward the sink apparatus 200 through the TMDS channels 310 to 330.

Further, in the HDMI specification, a clock signal is transmitted by a TMDS clock channel 340. Each of the TMDS channels 310 to 330 can transmit 10 bits of pixel data while one clock is transmitted by the TMDS clock channel 340.

Further, in the HDMI specification, a display data channel (DDC) 350 is arranged. The display data channel 350 is used by the source apparatus to read E-EDID (Enhanced Extended Display Identification Data) information of the sink apparatus 200. When the sink apparatus 200 is a display apparatus, the E-EDID information represents information about settings and performance such as model of apparatus, resolution, color property, and timing. The E-EDID information is stored in an E-EDID ROM 202 of the sink apparatus 200. Although not shown, the source apparatus 100 can store the E-EDID information in a similar manner to the sink apparatus 200, and can transmit the E-EDID information to the sink apparatus 200 as necessary.

Further, in the HDMI specification, a CEC (Consumer Electronics Control) line 361, a reserve line 362, an HPD (Hot Plug Detect) line 363, and the like are arranged. The CEC line 361 is a line for performing two-way communication of an apparatus control signal. In contrast to the display data channel 350 connecting apparatuses one-to-one, this CEC line 361 directly connects to all of the apparatuses connected to the HDMI.

The reserve line 362 is a line not used in the HDMI specification. The HPD line 363 is a line for detecting connection with another apparatus (hot plug) via an HDMI cable. In the embodiment of the present invention, the reserve line 362 and the HPD line 363 are assumed to be used to transmit an Ethernet (registered trademark) signal, an SPDIF normal signal, and an SPDIF opposite signal.

FIG. 16 is a figure showing an exemplary pin arrangement of a connector according to the HDMI specification. This figure shows each of pin numbers 301 and names of corresponding signals 302 in a pin arrangement called type A.

Each of the TMDS channels 310 to 330 and the TMDS clock channel 340 includes three pins, i.e., positive electrode, shield, and negative electrode. The 1st to 3rd pins correspond to the TMDS channel 330, the 4th to 6th pins correspond to the TMDS channel 320, the 7th to 9th pins correspond to the TMDS channel 310, and the 10th to 12th pins correspond to the TMDS clock channel 340.

Further, the 13th pin corresponds to the CEC line 361, the 14th pin corresponds to the reserve line 362, and the 19th pin corresponds to the HPD line 363. Further, the display data channel 350 includes three pins, i.e., serial clock (SCL), serial data (SDA), and ground, which respectively correspond to the 15th to 17th pins. It should be noted that the ground (the 17th pin) of the display data channel 350 is shared with the ground of the CEC line 361. The 18th pin corresponds to a power supply line (+5 V).

Figure 17:
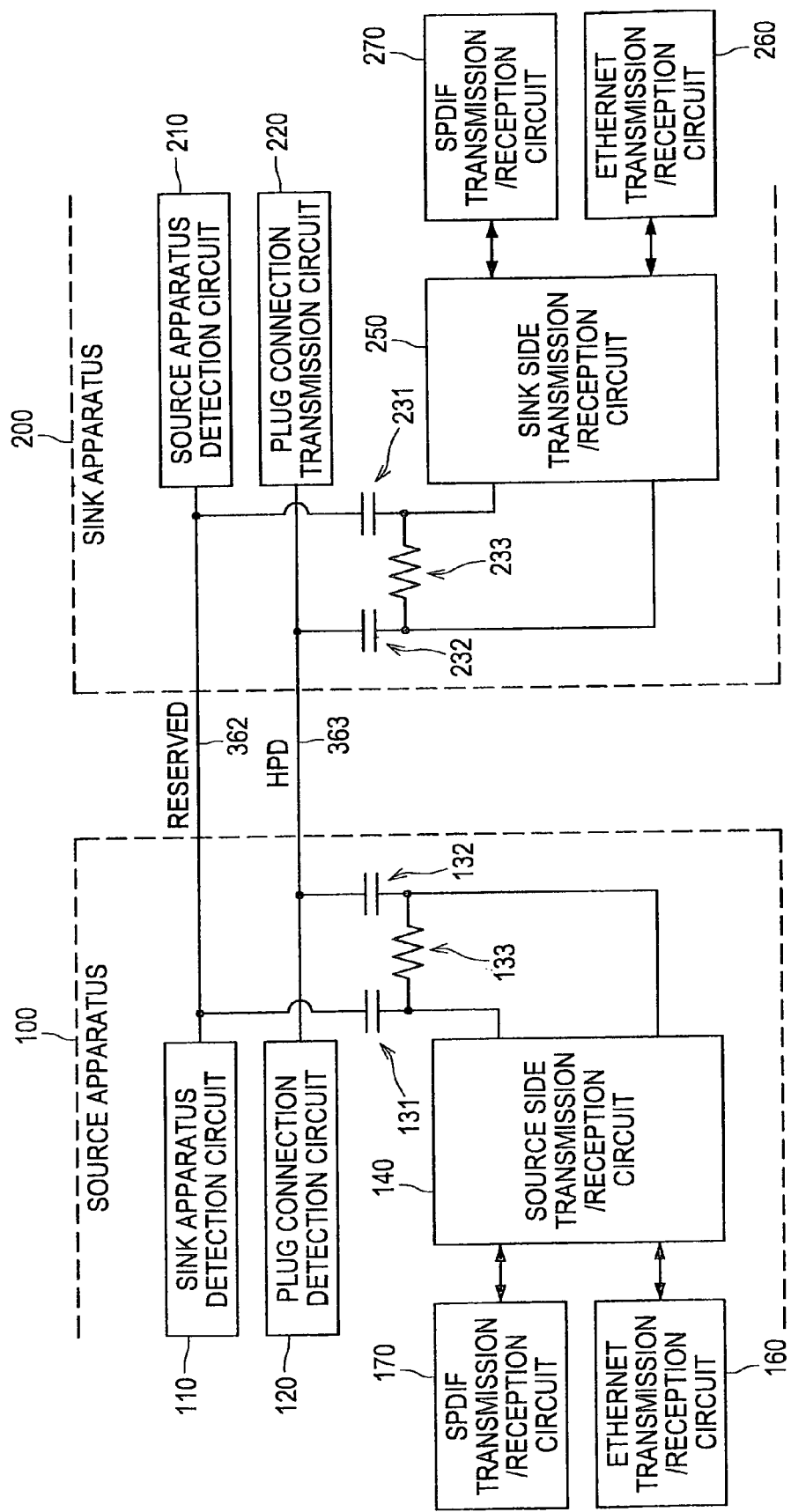
FIG. 17 is a figure showing an exemplary internal configuration of a source apparatus 100 and a sink apparatus 200 according to the embodiment of the present invention.

FIG. 17 is a figure showing an exemplary internal configuration of the source apparatus 100 and the sink apparatus 200 according to the embodiment of the present invention. Herein, configuration of the reserve line 362 and the HPD line 363, which is an essential portion of the embodiment of the present invention, is shown. The source apparatus 100 includes a sink apparatus model detection circuit 110, a plug connection detection circuit 120, a source side transmission/reception circuit 140, an SPDIF transmission/reception circuit 170, and an Ethernet (registered trademark) transmission/reception circuit 160. The sink apparatus 200 includes a source apparatus model detection circuit 210, a plug connection transmission circuit 220, a sink side transmission/reception circuit 250, an SPDIF transmission/reception circuit 270, and an Ethernet (registered trademark) transmission/reception circuit 260.

The reserve line 362 is a line not used in the HDMI specification as described above, but herein the reserve line 362 is used to detect a model of a connected apparatus in order to efficiently make use of the pin. In other words, the sink apparatus model detection circuit 110 of the source apparatus 100 detects the model of the sink apparatus 200 via the reserve line 362. Further, the source apparatus model detection circuit 210 of the sink apparatus 200 detects the model of the source apparatus 100 via the reserve line 362. A model of an apparatus assumed here is, for example, an apparatus using the reserve line 362 and the HPD line 363 according to the extended HDMI specification to transmit an Ethernet (registered trademark) signal in two ways (hereinafter referred to as extended HDMI model).

The HPD line 363 is a line for detecting connection with another apparatus via an HDMI cable as described above. The plug connection transmission circuit 220 of the sink apparatus 200 applies a bias of a predetermined voltage to a terminal connected to the HPD line 363 so as to notify that the sink apparatus 200 is connected. The plug connection detection circuit 120 of the source apparatus 100 compares a reference potential with the potential of a terminal connected to the HPD line 363 so as to detect the connection of the sink apparatus 200.

In the embodiment of the present invention, the source side transmission/reception circuit 140 and the sink side transmission/reception circuit 250 are connected to the reserve line 362 and the HPD line 363 having the functions as described above. In other words, the source side transmission/reception circuit 140 of the source apparatus 100 is connected to the reserve line 362 and the HPD line 363 via capacitors 131 and 132 and a resistor 133. The sink side transmission/reception circuit 250 of the sink apparatus 200 is connected to the reserve line 362 and the HPD line 363 via capacitors 231 and 232 and a resistor 233.

The source side transmission/reception circuit 140 connects an Ethernet (registered trademark) signal, transmitted in two ways using the reserve line 362 and the HPD line 363, to the Ethernet (registered trademark) transmission/reception circuit 160, and also connects an SPDIF signal, transmitted in two ways using the reserve line 362 and the HPD line 363, to the SPDIF transmission/reception circuit 170.

The sink side transmission/reception circuit 250 connects an Ethernet (registered trademark) signal, transmitted in two ways using the reserve line 362 and the HPD line 363, to the Ethernet (registered trademark) transmission/reception circuit 260, and also connects an SPDIF signal, transmitted in two ways using the reserve line 362 and the HPD line 363, to the SPDIF transmission/reception circuit 270.

The Ethernet (registered trademark) transmission/reception circuits 160 and 260 are circuits for transmitting and receiving Ethernet (registered trademark) signals, and for example, perform two-way communication according to the Internet Protocol (IP). In this case, a TCP (Transmission Control Protocol) and a UDP (User Datagram Protocol) may be used in a higher-layer of the Internet Protocol (IP). These Ethernet (registered trademark) transmission/reception circuits 160 and 260 can be achieved by the conventional art.

The SPDIF transmission/reception circuits 170 and 270 transmit and receive SPDIF signals in two ways according to the embodiment of the present invention. Since the SPDIF signal is made into two-way communication by the source side transmission/reception circuit 140 and the sink side transmission/reception circuit 250, a conventional transmission/reception circuit according to the SPDIF specification can be used as the SPDIF transmission/reception circuits 170 and 270.

FIG. 18 is a figure showing an exemplary configuration of the source side transmission/reception circuit 140 and the sink side transmission/reception circuit 250 according to the embodiment of the present invention.

Figure 18A:
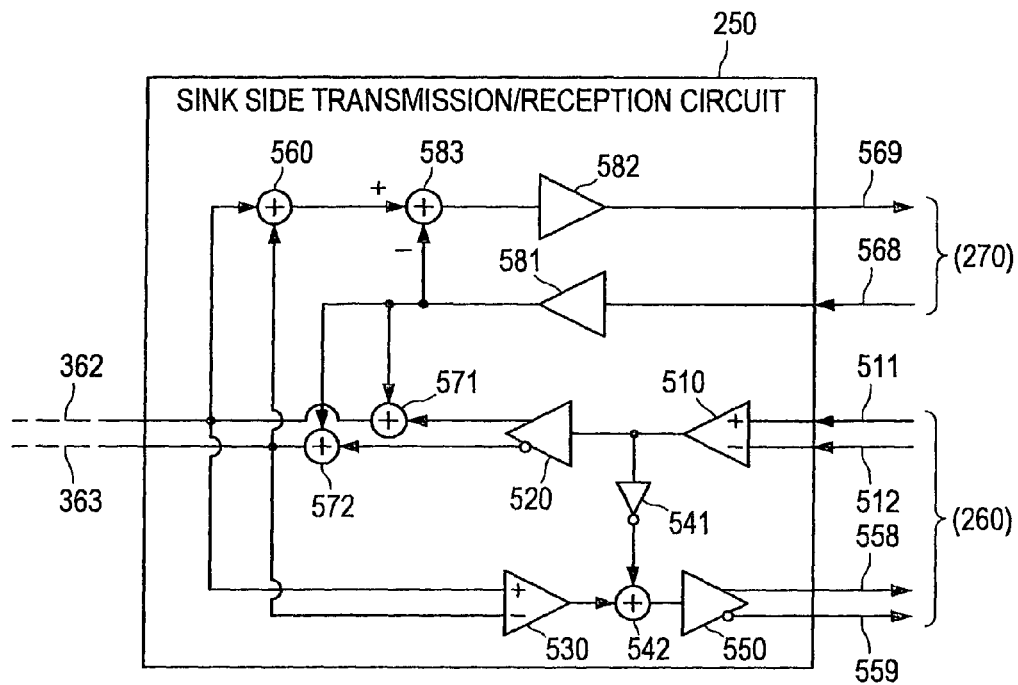
FIG. 18A is a figure showing an exemplary configuration of a sink side transmission/reception circuit 250 according to the embodiment of the present invention.

As shown in FIG. 18A, the sink side transmission/reception circuit 250 includes amplifying devices 510, 520, 530, 550, 581, and 582, an inverter 541, and operation devices 542, 560, 571, 572, and 583.

The amplifying device 510 amplifies a signal supplied from the Ethernet (registered trademark) transmission/reception circuit 260 via signal lines 511 and 512. A signal on the signal lines 511 and 512 is a differential signal, and the amplifying device 510 operates according to a differential input.

The amplifying device 520 amplifies the output of the amplifying device 510. The output of the amplifying device 520 is a differential signal, such that a positive signal is supplied to the operation device 571, whereas a negative signal is supplied to the operation device 572.

The amplifying device 530 amplifies a signal from the reserve line 362 and the HPD line 363. The signal on the reserve line 362 and the HPD line 363 is a differential signal, and the amplifying device 530 operates according to a differential input.

The inverter 541 is a circuit for inverting the output of the amplifying device 510. The operation device 542 is a circuit for adding the output of the inverter 541 and the output of the amplifying device 530. In other words, the inverter 541 and the operation device 542 obtain a signal by removing the output signal of the sink apparatus 200 from the signal on the reserve line 362 and the HPD line 363, and input the obtained signal to the amplifying device 550.

The amplifying device 550 amplifies the output of the amplifying device 542. The output of this amplifying device 550 is a differential signal, such that a positive signal is supplied to a signal line 558, whereas a negative signal is supplied to a signal line 559. The signal lines 558 and 559 are connected to the Ethernet (registered trademark) transmission/reception circuit 260. The Ethernet (registered trademark) transmission/reception circuit 260 is supplied with a signal obtained by removing the output signal of the sink apparatus 200 from the signal on the reserve line 362 and the HPD line 363.

The amplifying device 581 amplifies the signal supplied from the SPDIF transmission/reception circuit 270 via the signal line 568.

The operation device 571 is a circuit for adding the output of the amplifying device 581 and the positive output of the amplifying device 520. The operation device 572 is a circuit for adding the output of the amplifying device 581 and the negative output of the amplifying device 520.

Therefore, although the Ethernet (registered trademark) signal output from the amplifying device 520 is the differential signal, the SPDIF signal multiplexed by the operation devices 571 and 572 is a common-mode signal. Therefore, both of the Ethernet (registered trademark) signal and the SPDIF signal can be transmitted via the same pair of signal lines (the reserve line 362 and the HPD line 363).

The operation device 560 is a circuit for adding the outputs of the reserve line 362 and the HPD line 363. The operation device 583 is a circuit for adding the output of the operation device 560 and the inverted output of the amplifying device 581.

The amplifying device 582 amplifies the output of the operation device 583. The output of this amplifying device 582 is supplied to the SPDIF transmission/reception circuit 270 via a signal line 569.

Therefore, the operation device 583 subtracts the signal supplied by the amplifying device 581 from the SPDIF signal multiplexed by the operation devices 571 and 572, so that the signal from the source side transmission/reception circuit 140 can be supplied to the signal line 569.

Figure 18B:
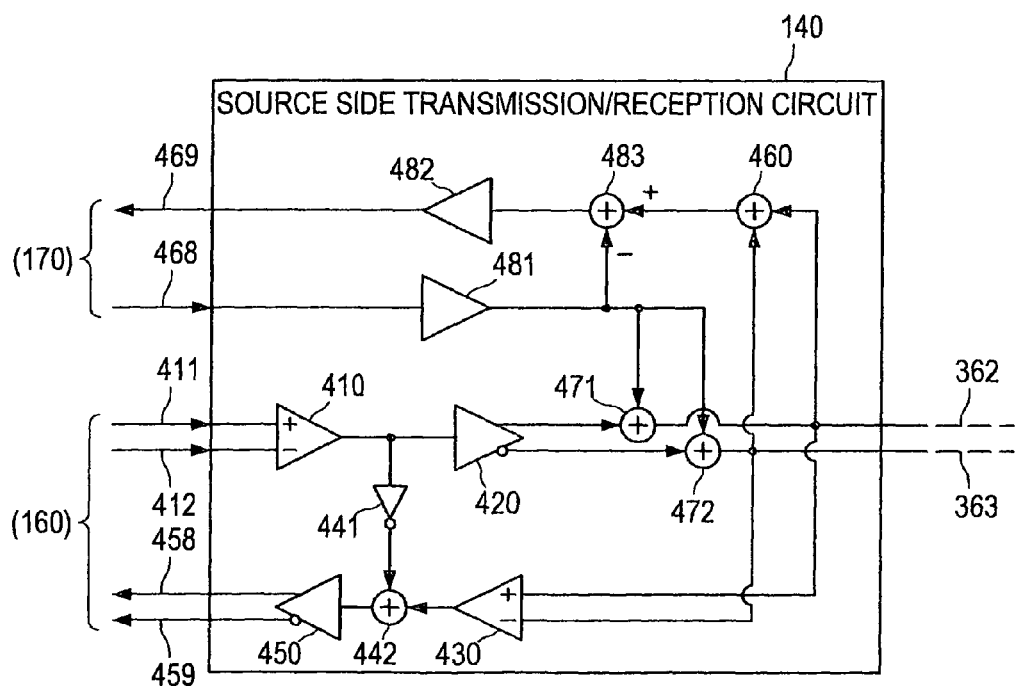
FIG. 18B is a figure showing an exemplary configuration of a source side transmission/reception circuit 140 according to the embodiment of the present invention.

As shown in FIG. 18B, the source side transmission/reception circuit 140 includes amplifying devices 410, 420, 430, 450, 481, and 482, an inverter 441, and operation devices 442, 460, 471, 472, and 483.

The amplifying device 410 amplifies a signal supplied from the Ethernet (registered trademark) transmission/reception circuit 160 via signal lines 411 and 412. A signal on the signal lines 411 and 412 is a differential signal, and the amplifying device 410 operates according to a differential input.

The amplifying device 420 amplifies the output of the amplifying device 410. The output of the amplifying device 420 is a differential signal, such that a positive signal is supplied to the operation device 471, whereas a negative signal is supplied to the operation device 472.

The amplifying device 430 amplifies a signal from the reserve line 362 and the HPD line 363. The signal on the reserve line 362 and the HPD line 363 is a differential signal, and the amplifying device 430 operates according to a differential input.

The inverter 441 is a circuit for inverting the output of the amplifying device 410. The operation device 442 is a circuit for adding the output of the inverter 441 and the output of the amplifying device 430. In other words, the inverter 441 and the operation device 442 obtain a signal by removing the output signal of the source apparatus 100 from the signal on the reserve line 362 and the HPD line 363, and input the obtained signal to the amplifying device 450.

The amplifying device 450 amplifies the output of the amplifying device 442. The output of the amplifying device 450 is a differential signal, such that a positive signal is supplied to a signal line 458, whereas a negative signal is supplied to a signal line 459. The signal lines 458 and 459 are connected to the Ethernet (registered trademark) transmission/reception circuit 160. The Ethernet (registered trademark) transmission/reception circuit 160 is supplied with a signal obtained by removing the output signal of the source apparatus 100 from the signal on the reserve line 362 and the HPD line 363.

The amplifying device 481 amplifies the signal supplied from the SPDIF transmission/reception circuit 170 via the signal line 468.

The operation device 471 is a circuit for adding the output of the amplifying device 481 and the positive output of the amplifying device 420. The operation device 472 is a circuit for adding the output of the amplifying device 481 and the negative output of the amplifying device 420.

Therefore, although the Ethernet (registered trademark) signal output from the amplifying device 420 is the differential signal, the SPDIF signal multiplexed by the operation devices 471 and 472 is a common-mode signal. Therefore, both of the Ethernet (registered trademark) signal and the SPDIF signal can be transmitted via the same pair of signal lines (the reserve line 362 and the HPD line 363).

The operation device 460 is a circuit for adding the outputs of the reserve line 362 and the HPD line 363. The operation device 483 is a circuit for adding the output of the operation device 460 and the inverted output of the amplifying device 481.

The amplifying device 482 amplifies the output of the operation device 483. The output of the amplifying device 482 is supplied to the SPDIF transmission/reception circuit 170 via a signal line 469.

Therefore, the operation device 483 subtracts the signal supplied by the amplifying device 481 from the SPDIF signal multiplexed by the operation devices 471 and 472, so that the signal from the sink side transmission/reception circuit 250 can be supplied to the signal line 469.

The amplifying devices 420 and 520 are an example of a first transmission unit recited in claims. The operation devices 442 and 542 are an example of an extraction unit recited in claims. The operation devices 471, 472, 571, and 572 are an example of a second transmission unit recited in claims. The operation devices 483 and 583 are an example of a second extraction unit recited in claims.

FIG. 19 is a figure schematically showing operation in an applied example according to the embodiment of the present invention. In the applied example of the embodiment of the present invention, as described above, the reserve line 362 and the HPD line 363 are used to transmit the Ethernet (registered trademark) signal as the differential signal, and the same lines are used to transmit the SPDIF signal (the SPDIF normal signal and the SPDIF opposite signal) as the common-mode signal.

Operation of the above-described applied example according to the embodiment of the present invention is as shown in the same figure. As described above, the 14th pin corresponds to the reserve line 362, and the 19th pin corresponds to the HPD line 363. When none of the Ethernet (registered trademark) signal and the SPDIF signal is transmitted, operation is in accordance with a conventional HDMI specification. When the Ethernet (registered trademark) signal is transmitted, the positive signal of the Ethernet (registered trademark) signal is multiplexed to the 14th pin, and the negative signal of the Ethernet (registered trademark) signal is multiplexed to the 19th pin. When the SPDIF signal is transmitted, the positive signal of the SPDIF signal is multiplexed to the 14th and 19th pins. When both of the Ethernet (registered trademark) signal and the SPDIF signal are transmitted, the positive signal of the Ethernet (registered trademark) signal and the positive signal of the SPDIF signal are multiplexed to the 14th pin, and the negative signal of the Ethernet (registered trademark) signal and the positive signal of the SPDIF signal are multiplexed to the 19th pin.

Therefore, the Ethernet (registered trademark) signal and the SPDIF signal can be transmitted independently from each other through the reserve line 362 and the HPD line 363. Even when both of the signals are transmitted or only one of the signals is transmitted, they are supported without any special mechanism arranged on a receiving side (the source side transmission/reception circuit 140).

FIG. 20 is a figure showing an exemplary configuration of the sink apparatus model detection circuit 110 and the source apparatus model detection circuit 210 according to the applied example of the embodiment of the present invention.

Figure 20A:
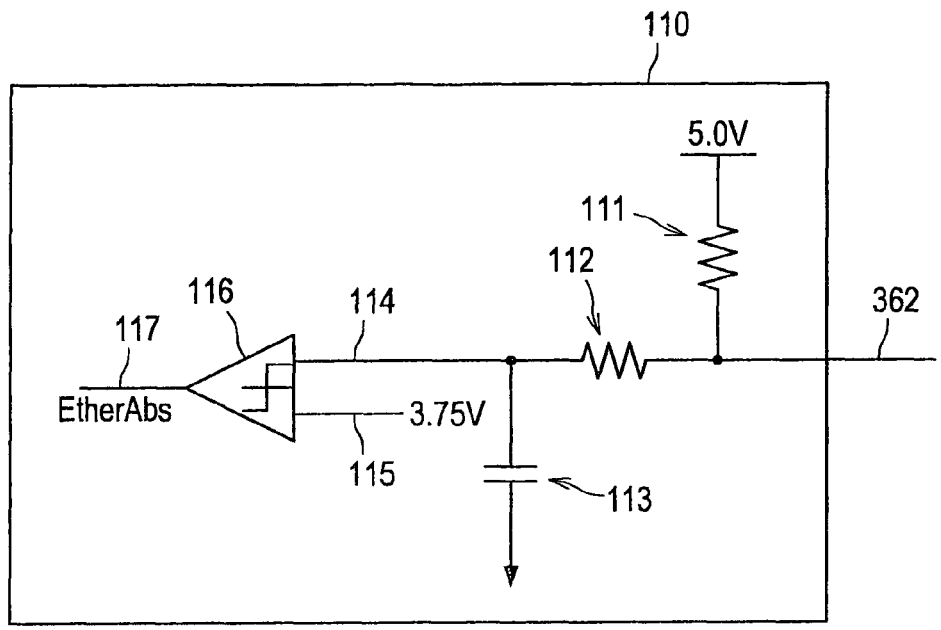
FIG. 20A is a figure showing an exemplary configuration of a sink apparatus model detection circuit 110 according to the applied example of the embodiment of the present invention.

As shown in FIG. 20A, the sink apparatus model detection circuit 110 has resistors 111 and 112, a capacitor 113, and a comparator 116. The resistor 111 is arranged to pull up the reserve line 362 to +5 V. The resistor 111 is arranged only when the source apparatus 100 is a particular model (for example, extended HDMI model). The pull-up is not performed when the source apparatus 100 is not the particular model. The resistor 112 and the capacitor 113 constitute a low-pass filter. The output of this low-pass filter is supplied to a signal line 114. The comparator 116 compares a direct-current potential supplied from the low-pass filter to the signal line 114 with a reference potential given to a signal line 115.

Figure 20B:
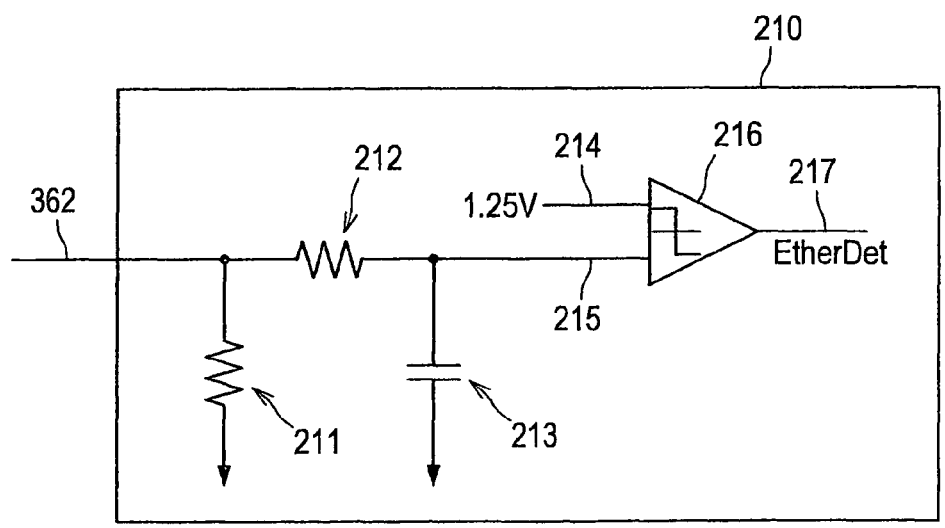
FIG. 20B is a figure showing an exemplary configuration of a source apparatus model detection circuit 210 according to the applied example of the embodiment of the present invention.

As shown in FIG. 20B, the source apparatus model detection circuit 210 has resistors 211 and 212, a capacitor 213, and a comparator 216. The resistor 211 is arranged to pull down the reserve line 362 to the ground potential. This resistor 211 is arranged only when the sink apparatus 200 is a particular model. The pull-down is not performed when the sink apparatus 200 is not the particular model. The resistor 212 and the capacitor 213 constitute a low-pass filter. The output of this low-pass filter is supplied to a signal line 215. The comparator 216 compares a direct-current potential supplied from the low-pass filter to the signal line 215 with a reference potential given to a signal line 214.

When the sink apparatus 200 is the particular model, the resistor 211 pulls down the potential of the reserve line 362 to 2.5 V. When the sink apparatus 200 is not the particular model, the circuit is opened and the potential of the reserve line 362 becomes 5 V. Therefore, for example, when the reference potential of the signal line 115 is configured to be 3.75 V, the source apparatus 100 can distinguish the model of the sink apparatus 200 based on the output of the signal line 117.

In a similar manner, when the source apparatus 100 is the particular model, the resistor 111 pulls up the potential of the reserve line 362 to 2.5 V. When the source apparatus 100 is not the particular model, the potential of the reserve line 362 becomes 0 V. Therefore, for example, when the reference potential of the signal line 214 is configured to be 1.25 V, the sink apparatus 200 can distinguish the model of the source apparatus 100 based on the output of the signal line 217.

Since these signals for detecting the model are transmitted by a direct-current bias potential, these signals do not affect the Ethernet (registered trademark) signal or the SPDIF signal transmitted in alternating current.

FIG. 21 is a figure showing an exemplary configuration of the plug connection detection circuit 120 and the plug connection transmission circuit 220.

Figure 21A:
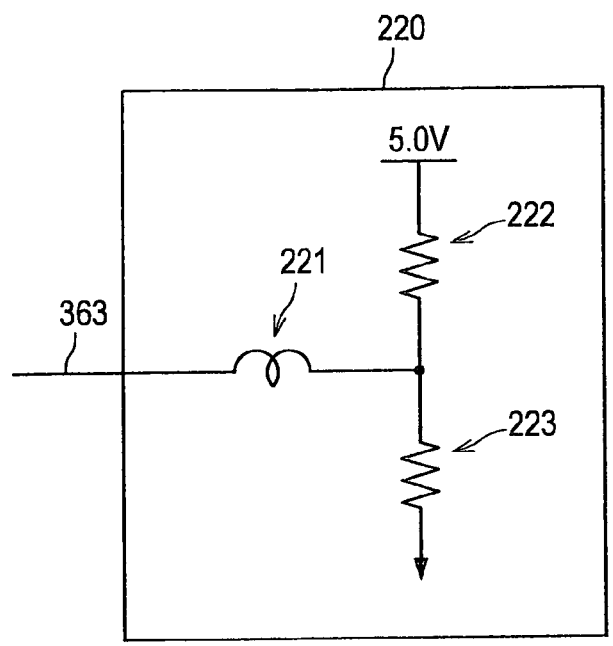
FIG. 21A is a figure showing an exemplary configuration of a plug connection transmission circuit 220 according to the embodiment of the present invention.

As shown in FIG. 21A, the plug connection transmission circuit 220 has a choke coil 221 and resistors 222 and 223. The choke coil 221 and the resistors 222 and 223 apply, for example, a bias of about 4 V to the HPD line 363.

Figure 21B:
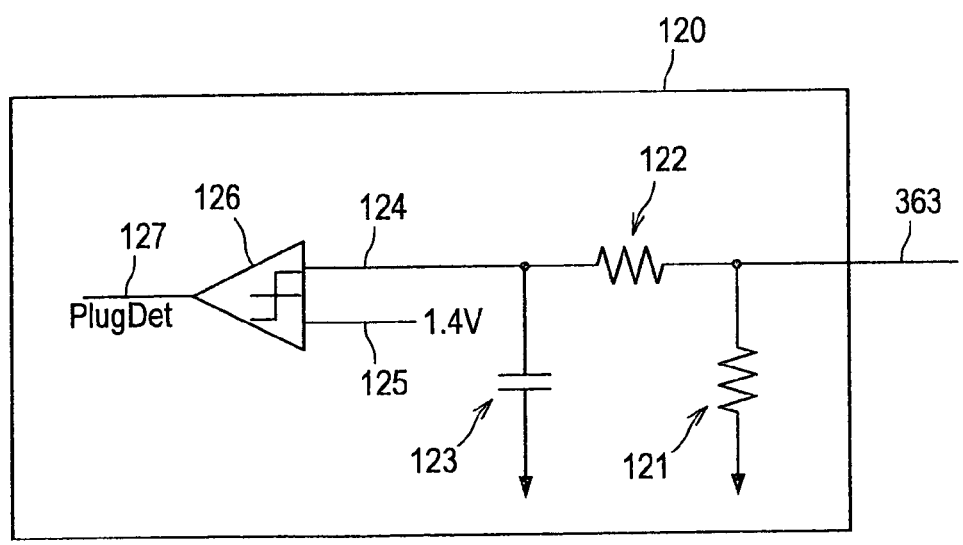
FIG. 21B is a figure showing an exemplary configuration of a plug connection detection circuit 120 according to the embodiment of the present invention.

As shown in FIG. 21B, the plug connection detection circuit 120 includes resistors 121 and 122, a capacitor 123, and a comparator 126. The resistor 121 is arranged to pull down the HPD line 363 to the ground potential. The resistor 122 and the capacitor 123 constitute a low-pass filter. The output of this low-pass filter is supplied to a signal line 124. The comparator 126 compares a direct-current potential supplied from the low-pass filter to the signal line 124 with a reference potential given to a signal line 125.

Herein, for example, the reference potential of 1.4 V is assumed to be given to the signal line 125. When the source apparatus 100 is not connected to the HPD line 363, the input potential is pulled down by the resistor 121, so that the potential of the signal line 124 becomes lower than the reference potential of the signal line 125. On the other hand, when the source apparatus 100 is connected to the HPD line 363, the bias of 4 V is applied, so that the potential of the signal line 124 becomes higher than the reference potential of the signal line 125. Therefore, the source apparatus 100 can detect whether the sink apparatus 200 is connected or not based on the output of the signal line 127.

Since these signals for detecting the plug connection are transmitted by a direct-current bias potential, these signals do not affect the Ethernet (registered trademark) signal or the SPDIF signal transmitted in alternating current.

Therefore, according to this applied example, two-way communication can be performed with the SPDIF normal signal and the SPDIF opposite signal even on the cable according to the HDMI specification.

As described above, according to the embodiment of the present invention, the operation device 12 adds the inverted signal of the output signal of the player 10 to the signal on the cable 30 transmitted from the amplifying device 11 of the player 10 to the AV amplifier 20, thus being able to extract the input signal of the player 10. Similarly, the operation device 22 adds the inverted signal of the output signal of the AV amplifier 20 to the signal on the cable 30 transmitted from the amplifying device 21 of the AV amplifier 20 to the player 10, thus being able to extract the input signal of the AV amplifier 20. Therefore, two-way communication of the SPDIF normal signal 31 and the SPDIF opposite signal 32 can be achieved using the cable 30. When the two-way communication bit of the channel status of the signal transmitted from the player 10 indicates that two-way communication is enabled, two-way communication sequence starts upon transmission of the SPDIF opposite signal. Therefore, new applications can be supported by extending the SPDIF specification to enable two-way communication while maintaining compatibility with the SPDIF specification.

For example, as explained with FIGS. 9 and 10, apparatuses can be controlled by using an information communication frame. Further, as explained with FIG. 11, the clock synchronization can be performed. Further, as explained with FIG. 12, secure transmission can be performed by using encryption bits and user information. Further, as explained with FIG. 13, decoding of encoded data can be performed by another apparatus. Further, as explained with FIG. 14, the synchronization of D/A conversion and A/D conversion in multi-track recording can be easily achieved. Further, as explained with FIG. 18, the embodiment of the present invention can be applied not only to a cable according to the SPDIF specification but also to a cable according to the HDMI specification.

It should be noted that the embodiment of the present invention is an example for implementing the invention, and has a correspondence relationship with the invention-specifying matters recited in claims. However, the invention is not limited to these matters and can be variously modified without departing from the spirit of the invention.

The processing steps explained in the embodiment of the present invention may be understood as a method including the series of steps, and may be understood as a program for causing a computer to execute the series of steps or a recording medium storing the program. For example, CD (Compact Disc), MD (Mini Disc), DVD (Digital Versatile Disk), memory card, and Blu-ray Disk (registered trademark) may be used as the recording medium.

INDUSTRIAL APPLICABILITY

This invention can be widely applied to, for example, an interface circuit and the like for transmitting a digital signal such as an audio signal arranged in an apparatus such as an AV (Audio/Visual) apparatus.

DESCRIPTION OF REFERENCE NUMERALS 10, 610, 710, 81: Player
11, 13, 21, 23, 611, 613, 621, 623, 811, 813, 821, 823, 841, 843, 851, 853: Amplifying device
12, 22, 612, 622, 812, 822, 842, 852: Operation device
14, 24, 614, 624, 814, 824, 844, 854: Output terminal
15, 25, 615, 625, 815, 825, 845, 855: Input terminal
20, 620, 720, 820: AV amplifier
30, 50, 630, 730, 830, 860: Cable
31, 51: SPDIF normal signal
32, 52: SPDIF opposite signal
39: Ground line
40: Television receiver apparatus
100: Source apparatus
101: Transmitter
110: Sink apparatus model detection circuit
111, 112, 121, 122, 133, 211, 212, 222, 233: Resistor
113, 123, 131, 213, 231: Capacitor
116, 126, 216: Comparator
120: Plug connection detection circuit
140: Source side transmission/reception circuit
160: Ethernet (registered trademark) transmission/reception circuit
170, 270: SPDIF transmission/reception circuit
200: Sink apparatus
201: Receiver
210: Source apparatus model detection circuit
220: Plug connection transmission circuit
221: Choke coil
250: Sink side transmission/reception circuit
260: Ethernet (registered trademark) transmission/reception circuit
300: Cable
410, 420, 430, 450, 481, 482, 510, 520, 530, 550, 581, 582: Amplifying device
441, 541: Inverter
442, 460, 471, 472, 483, 542, 560, 571, 572, 583: Operation device
616, 816, 826: Normal signal transmission unit
617, 817, 827: Opposite signal transmission unit
626: Normal signal transmission unit
627: Opposite signal transmission unit
711, 721: Internal clock generation circuit
712, 722: Clock component restructuring circuit
713, 723: Clock switching device
714, 724: Control microcomputer
715: Recording medium access unit
716, 828: Decoding unit
717: Recording medium
725: Latch
726: D/A converting device
727: Opposite signal transmission unit
840: Recorder
846: Reproducing unit
847: Recording unit
850: Converting device
856: A/D converting device
857: D/A converting device
858: Clock generation circuit
871: Speaker
872: Microphone

The invention claimed is:

1. An interface circuit comprising:
a first transmission unit for outputting a first output signal, as a differential signal, for receipt by an external apparatus by way of a transmission path;
a first extraction unit for extracting a first input signal by adding an inverted signal of the first output signal to a signal on the transmission path;
a second transmission unit for multiplexing on the transmission path a second output signal, as a common-mode signal, including two-way information indicating that two-way communication is enabled, and for transmitting the second output signal to the external apparatus by way of the transmission path; and
a second extraction unit for extracting a second input signal by adding an inverted signal of the second output signal to the signal on the transmission path.

2. An interface circuit comprising:
a first transmission unit for outputting a first output signal, as a differential signal, for receipt by an external apparatus by way of a transmission path;
a first extraction unit for extracting a first input signal by adding an inverted signal of the first output signal to a signal on the transmission path;
a second transmission unit for multiplexing on the transmission path a second output signal as a common-mode signal, and for transmitting the second output signal to the external apparatus by way of the transmission path; and
a second extraction unit for extracting a second input signal by adding an inverted signal of the second output signal to the signal on the transmission path,
wherein the second transmission unit transmits the second output signal only when the second input signal includes two-way information indicating that two-way communication is enabled.

* * * * *